(12) United States Patent
Addepalli et al.

(10) Patent No.: US 8,863,256 B1
(45) Date of Patent: Oct. 14, 2014

(54) SYSTEM AND METHOD FOR ENABLING SECURE TRANSACTIONS USING FLEXIBLE IDENTITY MANAGEMENT IN A VEHICULAR ENVIRONMENT

(75) Inventors: Sateesh K. Addepalli, San Jose, CA (US); Fabio R. Maino, Palo Alto, CA (US); Flavio Bonomi, Palo Alto, CA (US); Lillian Lei Dai, Rockville, MD (US); Vina Ermagan, San Jose, CA (US); Alexander Loukissas, San Francisco, CA (US); Erick D. Lee, Santa Clara, CA (US); Landon Curt Noll, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 261 days.

(21) Appl. No.: 13/014,605

(22) Filed: Jan. 26, 2011

Related U.S. Application Data

(60) Provisional application No. 61/433,138, filed on Jan. 14, 2011.

(51) Int. Cl.
    G06F 7/04      (2006.01)
    H04L 29/06    (2006.01)
    H04W 12/08   (2009.01)

(52) U.S. Cl.
    CPC ............. *H04L 63/107* (2013.01); *H04W 12/08* (2013.01)
    USPC ......... 726/7; 726/6; 726/2; 713/168; 713/192

(58) Field of Classification Search
    CPC ... G06F 21/62; G06F 21/6209; G06F 21/606; G06F 21/604; G06F 21/629; G06F 21/31; G06F 21/33; G06F 21/88; G06F 2221/2129; G06F 21/44; G06F 21/335; G06F 21/45; G06F 2221/2141; H04L 67/1014; H04L 67/12; H04L 67/14; H04L 12/06; H04L 63/08; H04L 63/10; H04L 63/105; H04L 2463/102; H04L 63/20; H04L 63/107; H04W 12/06; H04W 4/02; H04W 64/003; H04W 84/005; H04W 88/02
    USPC ..................... 726/2–7; 705/64; 455/410, 411; 713/168, 192
    See application file for complete search history.

(56) References Cited

U.S. PATENT DOCUMENTS

| 5,428,666 A | 6/1995 | Fyfe et al. |
| 5,604,787 A | 2/1997 | Kotzin et al. |

(Continued)

FOREIGN PATENT DOCUMENTS

| DE | 10146664 A1 | 2/2003 |
| EP | 1337119 A | 8/2003 |

(Continued)

OTHER PUBLICATIONS

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.

(Continued)

*Primary Examiner* — Nirav B Patel
(74) *Attorney, Agent, or Firm* — Patent Capital Group

(57) ABSTRACT

A method in one embodiment includes detecting an event for a transaction on an on-board unit (OBU) of a vehicle, where the event has a trigger associated with an agent. The method also includes determining whether the transaction is authorized, identifying network credentials in an identity profile that corresponds to the agent, providing network credentials to a transaction application corresponding to the transaction, and accessing a remote network using the network credentials. Certain embodiments include selecting the network credentials from a plurality of available network credentials corresponding to the agent. In more specific embodiments, the network credentials include one or more virtual subscriber identity modules (VSIMs) of a plurality of VSIMs provisioned on the OBU. In specific embodiments, the network credentials are mapped to a combination of two or more of the agent, the transaction application, and a predefined current location of the vehicle.

34 Claims, 17 Drawing Sheets

(56) References Cited

U.S. PATENT DOCUMENTS

| | | |
|---|---|---|
| 5,737,215 A | 4/1998 | Schricker et al. |
| 5,763,862 A | 6/1998 | Jachimowicz et al. |
| 5,933,773 A | 8/1999 | Barvesten |
| 5,987,325 A | 11/1999 | Tayloe |
| 6,002,929 A | 12/1999 | Bishop et al. |
| 6,078,652 A | 6/2000 | Barak |
| 6,169,387 B1 | 1/2001 | Kaib |
| 6,175,789 B1 | 1/2001 | Beckert et al. |
| 6,285,869 B1 | 9/2001 | Shannon et al. |
| 6,320,351 B1 | 11/2001 | Ng et al. |
| 6,427,072 B1 | 7/2002 | Reichelt |
| 6,427,073 B1 | 7/2002 | Kortesalmi et al. |
| 6,484,082 B1 | 11/2002 | Millsap et al. |
| 6,490,679 B1 | 12/2002 | Tumblin et al. |
| 6,516,357 B1 | 2/2003 | Hamann et al. |
| 6,526,272 B1 | 2/2003 | Bansal et al. |
| 6,574,734 B1 * | 6/2003 | Colson et al. ............... 726/21 |
| 6,587,127 B1 | 7/2003 | Leeke et al. |
| 6,604,140 B1 | 8/2003 | Beck et al. |
| 6,643,504 B1 | 11/2003 | Chow et al. |
| 6,668,179 B2 | 12/2003 | Jiang |
| 6,714,799 B1 | 3/2004 | Park et al. |
| 6,721,580 B1 | 4/2004 | Moon |
| 6,735,506 B2 | 5/2004 | Breed et al. |
| 6,757,262 B1 | 6/2004 | Weisshaar et al. |
| 6,823,244 B2 | 11/2004 | Breed |
| 6,868,282 B2 | 3/2005 | Carlsson |
| 6,914,517 B2 | 7/2005 | Kinsella |
| 6,925,425 B2 | 8/2005 | Remboski et al. |
| 6,928,299 B1 | 8/2005 | Rinne et al. |
| 6,934,391 B1 | 8/2005 | Linkola et al. |
| 6,957,199 B1 | 10/2005 | Fisher |
| 6,980,830 B2 | 12/2005 | Ahonen |
| 7,039,221 B1 | 5/2006 | Tumey et al. |
| 7,050,897 B2 | 5/2006 | Breed et al. |
| 7,064,711 B2 | 6/2006 | Strickland et al. |
| 7,069,144 B2 | 6/2006 | Yoshihara et al. |
| 7,082,359 B2 | 7/2006 | Breed |
| 7,096,316 B1 | 8/2006 | Karr et al. |
| 7,171,460 B2 | 1/2007 | Kalavade et al. |
| 7,178,724 B2 | 2/2007 | Tamagno et al. |
| 7,185,161 B2 | 2/2007 | Kang |
| 7,218,930 B2 | 5/2007 | Ko et al. |
| 7,222,783 B2 | 5/2007 | Merrien |
| 7,259,469 B2 | 8/2007 | Brummett et al. |
| 7,363,056 B2 | 4/2008 | Faisy |
| 7,389,178 B2 | 6/2008 | Raz et al. |
| 7,558,110 B2 | 7/2009 | Mizushima et al. |
| 7,564,842 B2 | 7/2009 | Callaway et al. |
| 7,593,605 B2 | 9/2009 | King et al. |
| 7,603,107 B2 | 10/2009 | Ratert et al. |
| 7,606,643 B2 | 10/2009 | Hunt et al. |
| 7,630,802 B2 | 12/2009 | Breed |
| 7,631,033 B2 | 12/2009 | Zehler |
| 7,636,626 B2 | 12/2009 | Oesterling et al. |
| 7,689,231 B2 | 3/2010 | Mardiks et al. |
| 7,689,251 B2 | 3/2010 | Bae |
| 7,729,725 B2 | 6/2010 | Stenmark |
| 7,738,891 B2 | 6/2010 | Tenhunen et al. |
| 7,755,472 B2 | 7/2010 | Grossman |
| 7,778,227 B2 | 8/2010 | Gibbs |
| 7,787,602 B2 | 8/2010 | Pearson et al. |
| 7,791,310 B2 | 9/2010 | Luz et al. |
| 7,792,618 B2 | 9/2010 | Quigley et al. |
| 7,808,375 B2 | 10/2010 | Bertness et al. |
| 7,844,817 B2 | 11/2010 | Mueller et al. |
| 7,849,020 B2 * | 12/2010 | Johnson ............... 705/64 |
| 7,904,569 B1 | 3/2011 | Gelvin et al. |
| 7,917,251 B2 | 3/2011 | Kressner et al. |
| 7,957,729 B2 | 6/2011 | Roter et al. |
| 7,957,744 B2 | 6/2011 | Oesterling et al. |
| 8,054,038 B2 | 11/2011 | Kelty et al. |
| 8,061,140 B2 | 11/2011 | Harmon |
| 8,063,797 B1 | 11/2011 | Sonnabend et al. |
| 8,081,643 B2 | 12/2011 | Sonoda et al. |
| 8,086,395 B2 | 12/2011 | Mino |
| 8,095,184 B2 | 1/2012 | Hiltunen et al. |
| 8,100,206 B2 | 1/2012 | Kressner et al. |
| 8,131,317 B2 | 3/2012 | Lee |
| 8,135,443 B2 | 3/2012 | Aleksic et al. |
| 8,140,064 B2 | 3/2012 | Mardiks |
| 8,143,741 B2 | 3/2012 | Funakoshi et al. |
| 8,144,596 B2 | 3/2012 | Veillette |
| 8,180,400 B2 | 5/2012 | Shin et al. |
| 8,195,233 B2 | 6/2012 | Morikuni et al. |
| 8,195,235 B2 | 6/2012 | Montes |
| 8,207,642 B2 | 6/2012 | Lafontaine et al. |
| 8,233,389 B2 | 7/2012 | Yim et al. |
| 8,244,468 B2 | 8/2012 | Scalisi et al. |
| 8,249,087 B2 | 8/2012 | Takada et al. |
| 8,294,420 B2 | 10/2012 | Kocher |
| 8,296,373 B2 | 10/2012 | Bosworth et al. |
| 8,335,493 B2 | 12/2012 | Angelhag |
| 8,364,959 B2 * | 1/2013 | Bhanoo et al. ............... 713/168 |
| 8,378,623 B2 | 2/2013 | Kusch et al. |
| 2002/0006139 A1 | 1/2002 | Kikkawa et al. |
| 2002/0072388 A1 | 6/2002 | Korneluk et al. |
| 2002/0097855 A1 | 7/2002 | Neudeck et al. |
| 2002/0103964 A1 | 8/2002 | Igari |
| 2002/0165008 A1 | 11/2002 | Sashihara et al. |
| 2002/0174360 A1 * | 11/2002 | Ikeda ............... 713/200 |
| 2002/0198632 A1 | 12/2002 | Breed et al. |
| 2003/0005435 A1 | 1/2003 | Nelger et al. |
| 2003/0009271 A1 | 1/2003 | Akiyama |
| 2003/0028763 A1 | 2/2003 | Malinen et al. |
| 2003/0046228 A1 | 3/2003 | Berney |
| 2003/0051041 A1 | 3/2003 | Kalavade et al. |
| 2003/0083968 A1 | 5/2003 | Marsh et al. |
| 2003/0152038 A1 | 8/2003 | Oshima et al. |
| 2003/0191939 A1 | 10/2003 | Tsai et al. |
| 2004/0008677 A1 | 1/2004 | Cen |
| 2004/0022216 A1 | 2/2004 | Shi |
| 2004/0023689 A1 | 2/2004 | Ahonen |
| 2004/0024670 A1 | 2/2004 | Valenzuela et al. |
| 2004/0042604 A1 | 3/2004 | Hiltunen et al. |
| 2004/0073339 A1 | 4/2004 | Ruoppolo |
| 2004/0083043 A1 | 4/2004 | Akiyama et al. |
| 2004/0087305 A1 | 5/2004 | Jiang et al. |
| 2004/0137890 A1 | 7/2004 | Kalke |
| 2004/0143386 A1 | 7/2004 | Yoshihara et al. |
| 2004/0162653 A1 | 8/2004 | Ban et al. |
| 2004/0165656 A1 | 8/2004 | Shiue et al. |
| 2004/0171386 A1 | 9/2004 | Mitjana |
| 2004/0204087 A1 | 10/2004 | Carlsson |
| 2004/0229601 A1 | 11/2004 | Zabawskyj et al. |
| 2004/0230345 A1 | 11/2004 | Tzamaloukas |
| 2004/0249915 A1 | 12/2004 | Russell |
| 2004/0256451 A1 | 12/2004 | Goman et al. |
| 2005/0009563 A1 | 1/2005 | Stenmark |
| 2005/0018883 A1 * | 1/2005 | Scott ............... 382/115 |
| 2005/0020250 A1 | 1/2005 | Chaddha et al. |
| 2005/0039027 A1 | 2/2005 | Shapiro |
| 2005/0065678 A1 | 3/2005 | Smith et al. |
| 2005/0075137 A1 | 4/2005 | Reemtsma |
| 2005/0101323 A1 | 5/2005 | De Beer |
| 2005/0124288 A1 | 6/2005 | Karmi et al. |
| 2005/0162687 A1 * | 7/2005 | Lee ............... 358/1.15 |
| 2005/0239504 A1 | 10/2005 | Ishi et al. |
| 2005/0266883 A1 | 12/2005 | Chatrath |
| 2005/0271037 A1 | 12/2005 | Habaguchi et al. |
| 2005/0282554 A1 | 12/2005 | Shyy et al. |
| 2006/0020783 A1 | 1/2006 | Fisher |
| 2006/0031590 A1 | 2/2006 | Monette et al. |
| 2006/0059340 A1 | 3/2006 | Eldenmalm et al. |
| 2006/0068786 A1 | 3/2006 | Florence |
| 2006/0075242 A1 | 4/2006 | Aissi et al. |
| 2006/0076420 A1 | 4/2006 | Prevost et al. |
| 2006/0079237 A1 | 4/2006 | Liu et al. |
| 2006/0079254 A1 | 4/2006 | Hogan |
| 2006/0089157 A1 | 4/2006 | Casey |
| 2006/0129848 A1 | 6/2006 | Paksoy et al. |
| 2006/0160532 A1 | 7/2006 | Buckley et al. |
| 2006/0172772 A1 | 8/2006 | Bjorkner |
| 2006/0181521 A1 | 8/2006 | Perreault et al. |

(56) References Cited

U.S. PATENT DOCUMENTS

| | | |
|---|---|---|
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0021847 A1 | 1/2007 | Hyodo et al. |
| 2007/0027583 A1 | 2/2007 | Tamir et al. |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1 | 6/2007 | Breed |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1* | 11/2007 | Downes et al. ............. 726/5 |
| 2007/0271014 A1 | 11/2007 | Breed |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1 | 1/2008 | Helm |
| 2008/0028230 A1 | 1/2008 | Shatford |
| 2008/0040005 A1 | 2/2008 | Breed |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0147265 A1 | 6/2008 | Breed |
| 2008/0147271 A1 | 6/2008 | Breed |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1 | 9/2008 | Daniel |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1 | 11/2008 | Breed |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meyland |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1 | 2/2009 | Breed |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0312850 A1 | 12/2009 | Higuchi et al. |
| 2010/0005313 A1 | 1/2010 | Dai |
| 2010/0037057 A1* | 2/2010 | Shim et al. ............. 713/171 |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167724 A1 | 7/2010 | Haran et al. |
| 2010/0183016 A1 | 7/2010 | Bonk et al. |
| 2010/0202346 A1 | 8/2010 | Sitzes et al. |
| 2010/0215043 A1 | 8/2010 | Hisada |
| 2010/0232404 A1 | 9/2010 | Chen et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0280956 A1* | 11/2010 | Chutorash et al. ............. 705/64 |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1 | 5/2011 | Gurusamy |
| 2011/0149982 A1 | 6/2011 | Hwang et al. |
| 2012/0004933 A1 | 1/2012 | Foladare et al. |
| 2012/0089299 A1 | 4/2012 | Breed |
| 2012/0109418 A1 | 5/2012 | Lorber |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |

FOREIGN PATENT DOCUMENTS

| | | | |
|---|---|---|---|
| EP | 1696357 | 8/2006 | |
| EP | 1727383 | 11/2006 | |
| EP | 1737160 | 12/2006 | |
| EP | 1758335 | 2/2007 | |
| GB | 2294787 | 5/1996 | |
| GB | 2313257 A | 11/1997 | |
| GB | 2386803 A | 9/2003 | |
| GB | 2406925 | * 10/2003 | ............. G06F 1/00 |
| GB | 2406925 | 4/2005 | |
| JP | 2000194660 | 7/2000 | |
| WO | WO 92/19078 | 10/1992 | |
| WO | WO 99/24938 | 5/1999 | |
| WO | WO 99/27730 | 6/1999 | |
| WO | WO 99/46682 | 9/1999 | |
| WO | WO 00/79368 | 12/2000 | |
| WO | WO 0111577 | 2/2001 | |
| WO | WO 02/067563 | 8/2002 | |
| WO | WO 02/089449 | 11/2002 | |
| WO | WO 03/007639 | 1/2003 | |
| WO | WO 2004/021296 | 3/2004 | |
| WO | WO 2005/029890 | 3/2005 | |
| WO | WO 2006/094564 | 9/2006 | |
| WO | WO 2007/143342 | 12/2007 | |
| WO | WO 2008/040964 | 4/2008 | |
| WO | WO 2009/082759 | 7/2009 | |

OTHER PUBLICATIONS

U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.

U.S. Appl. No. 13/117,860, entitled "System and Method for Analyzing Vehicular Behavior in a Network Environment," filed May 27, 2011, Inventors: Sateesh K. Addepalli et al.

U.S. Appl. No. 13/108,631, entitled "System and Method for Real-Time Synthesis and Performance Enhancement of Audio/Video Data, and Noise Cancellation and Gesture Based User Interfaces in a Vehicular Environment," filed May 16, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

(56) References Cited

OTHER PUBLICATIONS

U.S. Appl. No. 13/087,884, entitled 'System and Method for Discovery, Trusted Execution, and Admission Control in a Vehicular Environment, filed Apr. 15, 2011, Inventors: Sateesh K. Addepalli et al.
U.S. Appl. No. 13/083,305, entitled "System and Method for Applications Management in a Networked Vehicular Environment," filed Apr. 8, 2011, Inventors: Sateesh K. Addepalli et al.
U.S. Appl. No. 13/118,024, entitled "System and Method for Enabling a Vehicular Access Network in a Vehicular Environment," filed May 27, 2011, Inventors: Sateesh K. Addepalli et al.
U.S. Appl. No. 13/104,737, entitled "System and Method for Internal Networking, Data Optimization and Dynamic Frequency Selection in a Vehicular Environment," filed May 10, 2011, Inventors: Sateesh K. Addepalli et al.
U.S. Appl. No. 13/114,659, entitled "System and Method for Transport, Network, Translation, and Adaptive Coding in a Vehicular Network Environment," filed May 24, 2011, Inventors: Sateesh K. Addepalli et al.
EPO May 22, 2012 European Search Report and Written Opinion from EP 12150208.2.
EPO Jan. 21, 2013 EPO Response to Communication regarding Written Opinion from EP 12150208.2.
PCT Apr. 22, 2009 International Search Report for PCT/US08/88320; 3 pages.
PCT Jun. 29, 2010 International Preliminary Report on Patentability and Written Opinion of the International Searching Authority for PCT/US08/88320; 10 pages.
EPO Jul. 1, 2013 EPO Communication regarding EP 12150208.2; 5 pages.
"Cisco Mobile Network Solutions for Commercial Transit Agencies," Cisco.com, © 2008 Cisco Systems, Inc., 8 pages; http://www.cisco.com/en/US/prod/collateral/routers/ps272/white_paper_c11-4921115.html.
"Cisco Mobile Network Solutions for Public Safety," Cisco.com, 2008 Cisco Systems, Inc., 7 pgs; http://www.cisco.com/en/US/prod/collateral/routers/ps272/prod_white_paper0900aecd806 220af.html.
"TCG Mobile Trusted Module Specification." Trusted Computing Group, Specification version 1.0, Revision 6, Jun. 2008, 105 pages; http://www.trustedcomputinggroup.org/files/resource_files/87852F33-1D09-3519-ADOCOF141CC6B10D/Revision_6-tcg-mobile-trusted-module-1_0.pdf.
Alves, T., et al., "TrustZone: Integrated Hardware and Software Security," Information Quarterly, vol. 3, No. 4, 2004, pp. 18-24; http://www.iqmagazineonline.com/magazine/pdf/v_3_4_pdf/Pg18_24_custZone_Secur.pdf.
Arsenault, A., et al., "Securely Available Credentials—Requirements," IETF, Network Working Group, RFC 3157, Baltimore Technologies, Aug. 2001, 20 pages.
Autonet Mobile, "Autonet Mobile Features, Technology Specifications," autonetmobile.com, 1 page; [retrieved and printed Apr. 8, 2011] http://www.autonetmobile.com/service/anmdev.html.
Autonet Mobile, "CARFI Features, Technology Specifications," autonetmobile.com, 1 page; [retrieved and printed Apr. 8, 2011] http://autonetmobile.com/service/carfidev.html.
Autonet Mobile, "It's What Your Car has been Waiting for," autonetmobile.com, 2 pages; [retrieved and printed Apr. 8, 2011] http://www.autonetmobile.com/service/.
Bickhart, Ryan W., et al., "Transparent TCP-to-SCTP Translation Shim Layer," EuroBSDCon 2007, Copenhagen, Denmark; 14 pages.
Bilstrup, "A Survey Regarding Wireless Communication Standards Intended for a High-Speed Vehicle Environment," Technical Report IDE0712, Feb. 2007, 51 pages.

Blazevic, Ljubica, et al., "A Location-Based Routing Method for Mobile Ad Hoc Networks," IEEE Transactions on Mobile Computing, vol. 4, No. 2, Mar./Apr. 2005; 14 pages.
Boman, K., Niemi, V. et al. "UMTS Security," Electronics and Communication Engineerying Journal, Oct. 2002, 14 pages; http://www.it.iitb.ac.in/~kavita/GSM_Security_Papers/New%20papers/umts_security.pdf.
Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.
Farinacci, D. et al., "LISP Mobile Node," Network Working Group Internet Draft, Feb. 1, 2010, 22 pages; http://tools.ietf.org/id/draft-meyer-lisp-mn-01.txt.
Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.
HSU, WAVE/DSRC Development and Standardization, Industrial Technology Research Institute, 2010, 84 pages.
Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.
Ibars, Christian et al., "Wireless Services in the Connected Vehicle Era," IEEE Communications Magazine, Dec. 23, 2010, 13 pages.
Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.
Lillian Lei Dai, "*Proactive Mobile Wireless Networks: an infrastructureless wireless network architecture for delay-sensitive applications*," Massachusetts Institute of Technology, Jun. 2008 (two parts submitted: Part 1-105 pages; Part 2-97 pages).
Robert Bosch GmbH, *Automotive Electrics Automotive Electronics, Systems and Components, New: Networking Hybrid Drive*, $5^{th}$ Edition, Nov. 2007, BentleyPublishers.com, 255 pages (two parts submitted: Part 1-121 pages; Part 2-131 pages).
Scarfone, Karen et al., "Guide to Instrusion Detection and Prevention Systems (IDPS)," NIST (National Institute of Standards and Technology), Special Publication 800-94, Feb. 2007, 127 pages; http://csrc.ncsl.nist.gov/publications/nistpubs/800-94/SP800-94.pdf.
Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.
Weigle, Dr. Michele, "Standards: WAVE/DSCRC/802.11p, CS 795/895 Vehicular Networks," Old Dominion University, Spring 2008, 19 pages.
Zeldovich, Nickalai et al., "Making Information Flow Explicit in HiStar," OSDI '06: $7^{th}$ USENIX Symposium on Operating Systems Design and Implementation, Nov. 2006, 16 pages.
Zeldovich, Nickolai et al., "Securing Distributed Systems with Information Flow Control," NSDI '08: $5^{th}$ USENIX Symposium on Networked Systems Design and Implementation, Apr. 2008, 16 pages.
U.S. Appl. No. 13/943,114, entitled "System and Method for Enabling a Vehicular Access Network in a Vehicular Environment," filed Jul. 16, 2013, Inventors: Sateesh K. Addepalli et al.
Freeman, Shanna, "How OnStar Works," HowStuffWorks.com, a Discovery Company; [Retrieved and printed Jul. 19, 2013] http://auto.howstuffworks.com/onstar2.htm/printable.
Wahab, et al.,"Driving Profile Modeling and Recognition Based on Soft Computer Approach," IEEE Transactions on Neural Networks, vol. 20, No. 4, Apr. 2009.

\* cited by examiner

SYSTEM AND METHOD FOR ENABLING SECURE TRANSACTIONS USING FLEXIBLE IDENTITY MANAGEMENT IN A VEHICULAR ENVIRONMENT

CROSS-REFERENCE TO RELATED APPLICATION

This application claims the benefit of priority under 35 U.S.C. §119(e) of U.S. Provisional Application Ser. No. 61/433,138, filed Jan. 14, 2011, by Sateesh K. Addepalli, et al., entitled "SYSTEM, METHOD, AND PROCESSES ASSOCIATED WITH CONNECTED VEHICLES," which is hereby incorporated by reference in its entirety.

TECHNICAL FIELD OF THE INVENTION

This invention relates in general to the field of electronic communications and, more particularly, to enabling secure transactions using flexible identity management in a vehicular environment.

BACKGROUND OF THE INVENTION

Networking architectures have grown increasingly complex and have been designed for use in a wide variety of communications environments. Demand continues to rise among the subscriber base of end users, however, for network access across diverse network environments. In particular, configuring suitable network architecture for vehicular environments (e.g., automobiles, airplanes, trains, boats, etc.) presents unique difficulties. Vehicles can be mobile across a large geographic area, can have internal networks related to the vehicle itself, can include more than one end user at a time, and can have more than one owner during the life of the vehicle. Providing the ability to conduct transactions in vehicular network environments in a secure manner and providing a secure and flexible identity management framework for various agents conducting the transactions present significant challenges to system designers, automobile manufacturers, service providers, and the like.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method in one example embodiment includes detecting an event for a transaction on an on-board unit (OBU) of a vehicle, where the event has a trigger associated with an agent. The method also includes determining whether the transaction is authorized, identifying network credentials of the agent, and providing the network credentials to a transaction application corresponding to the transaction. The method further includes accessing a remote network using the network credentials. In one embodiment, the network credentials are identified in an identity profile associated with the agent. In specific embodiments, the method includes providing application programming interfaces (APIs) to the transaction application to enable the transaction application to access one or more of a plurality of pieces of information of the identity profile. In other specific embodiments, the method includes evaluating a memory element to determine whether the transaction application is mapped to the agent.

A method in an another example embodiment includes initiating a transaction on an on board unit (OBU) of a vehicle and selecting first network credentials for a transaction application associated with the transaction to establish a network connection between the OBU and a remote node. In this embodiment, the first network credentials are selected from a plurality of available network credentials that correspond to an agent associated with the transaction. In more specific embodiments, the first network credentials include one or more virtual subscriber identity modules (VSIMs). In other more specific embodiments, the first network credentials are selected based on a mapping of the first network credentials to one or more predefined criteria and the agent.

A method in yet another example embodiment includes authenticating a first agent to an on board unit (OBU) of a vehicle if the first agent validates a first set of one or more authentication requirements and identifying a first identity profile corresponding to the first agent. The method also includes determining a role of the first agent in the vehicle and configuring the vehicle with the first identity profile, where the vehicle is configured based on the role of the first agent. In the example method, the first identity profile is one of a plurality of identity profiles provisioned on the OBU.

EXAMPLE EMBODIMENTS

Figure 1:
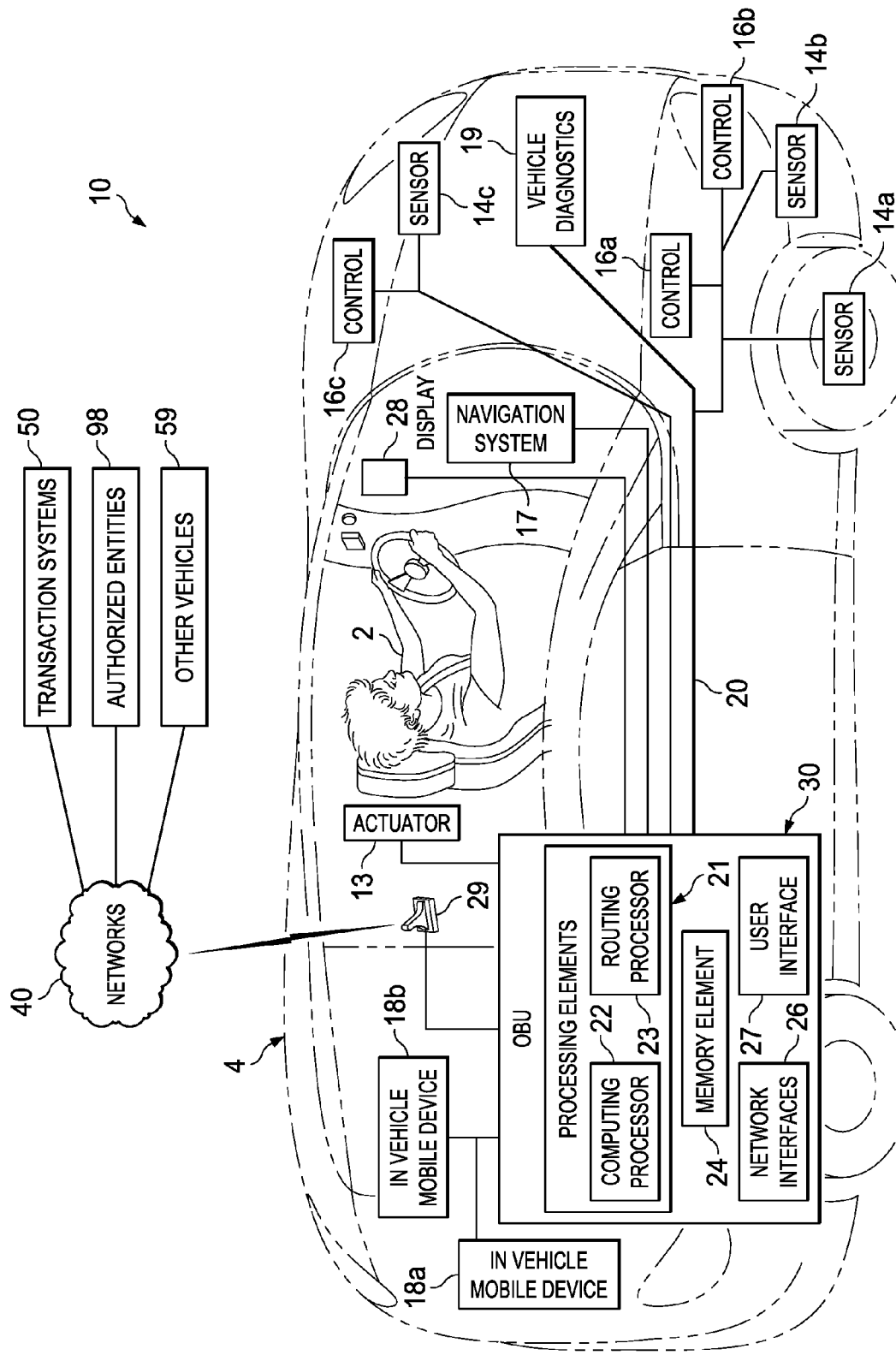
FIG. 1 is a simplified schematic diagram of a communication system for enabling secure transactions using flexible identity management in a vehicular environment in accordance with embodiments of the present disclosure.

Turning to FIG. 1, FIG. 1 is a simplified block diagram of a communication system 10 for enabling secure transactions using flexible identity management in a vehicular environment. The example architecture of FIG. 1 includes an end user (driver) 2 operating a vehicle 4 that includes an on-board unit (OBU) 30. In this particular example, OBU 30 includes processing elements 21, which include a computing processor 22 and a routing processor 23. OBU 30 also includes a memory element 24, network interfaces 26, a user interface 27, and a display 28. OBU 30 can be suitably coupled to a plurality of sensors 14a-c, a plurality of controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may also be suitably coupled to various in-vehicle mobile devices 18a-b at any given time, where such devices may be associated with particular end users (passengers or driver) within vehicle 4. OBU 30 may also include capabilities associated with navigation system 17 (e.g., a global positioning system (GPS)). FIG. 1 also includes networks 40, representing various types of connectivity to vehicle 4 (e.g., via antenna 29). Each established network of networks 40 has a logical coupling to remote network nodes or other external electronic devices, which may include transaction systems 50, authorized entities 98, and other vehicles 59.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems that may be employed to convey information across the myriad of machine devices (e.g., sensors 14*a-c*, controls 16*a-c*, actuator 13) in vehicle 4.

Embodiments of communication system 10 can enable secure transactions in a vehicular environment by using flexible identity management for agents associated with the transactions. Given the plethora of transaction agents (e.g., machine devices, humans, software agents, mobile devices, and authorized entities) and possible transactions (e.g., accessing one or more wireless/mobile/cellular networks and using network bandwidth and services, gaining access to various resources of the vehicle based on an identity profile and/or associated databases, gaining access to transaction applications in the vehicle, and engaging in commercial activities), numerous transaction scenarios may occur over the life of the vehicle. Such transaction scenarios may encompass, for example, toll or parking payments, vehicle miles traveled (VMT) systems, Internet commerce, original equipment manufacturer (OEM), gas and electric charging stations, roadside and/or drive-through kiosks, banking applications, vehicle dealer systems, location based service (LBS) system, vehicle system and its resources, mobile network operator system, travel agencies, rental and leasing agencies, network connection to Internet sites, vehicle-to-vehicle commerce, vehicle-to-mobile-device commerce, in-vehicle commerce systems, etc. Accordingly, it is important to have a unified, flexible, and secure identity and access framework to ensure that appropriate transactions can be executed by different agents over time in a secure manner. A unified identity management framework enables aggregation and association of these agents and transactions.

Communication system 10 may include on-board unit (OBU) 30 that validates credentials of each agent, grants appropriate levels of access, manages potential conflicts (e.g., by assigning priority to different agents), and provisions the appropriate wireless/mobile connectivity. An agent may be provisioned for authentication and access to a particular vehicle by provisioning at least one virtual subscriber identity module (VSIM) and/or an identity profile in OBU 30 of communication system 10. For each agent, an individualized, multi-factor authorization process may be used to validate the particular agent's credentials for accessing OBU 30 and for authorizing transactions on OBU 30. Authentication and confidentiality schemes may be specified for transaction applications corresponding to the particular transactions. Finally, appropriate wireless/mobile connectivity may be dynamically determined by evaluating the transaction, the agent, and a current geographical location of the vehicle. Thus, vehicular transactions may be securely enabled by managing the identity and authentication of agents associated with transactions.

For purposes of illustrating the operational aspects of communication system 10, it is important to first understand the activities and problems that may be present in electronic communication scenarios in a vehicular environment such as the one shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles. For example, a controller-area network (CAN) bus, a geographical positioning system (GPS), and personal mobile devices (e.g., mobile phones, smart mobile phones/devices, e-book readers, tablets, laptops/net books, portable navigation systems, multimedia devices, etc.) facilitate the coexistence of some of the many possible networks within a single vehicle such as a personal automobile. A CAN bus is a vehicle bus standard designed to allow microcontrollers, sensors, and other devices associated with a vehicle to communicate with each other within the vehicle (e.g., without a host computer). CAN is a message based protocol, designed for and typically used by automotive applications. With appropriate network access, the CAN bus can be used to provide real-time vehicle diagnostics from associated sensors and controls to a manufacturer of the vehicle or to any other authorized entity. A separate network in the vehicle may exist for IP devices involved in the vehicle navigation system (e.g., GPS) and, possibly, another network associated with simple content delivery. Other networks could be used for Internet access for end users through, for example, mobile devices. Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

In a vehicle that does not offer combined networking capabilities for the various possible networks, each of the devices associated with a particular network (e.g., CAN bus sensors, mobile devices, GPS, etc.) may have a one-to-one mapping to either a human agent or to the vehicle. Network access and any resulting fees from such access are typically dictated by the human agent or vehicle mapped to the particular device. While some of these devices may be used by other human agents (e.g., another human agent borrows a cell phone, has account privileges on a laptop, borrows an automobile with a GPS, etc.) network access and fee accrual does not ordinarily accommodate the preferences of the new user. In some cases, a mobile router used to facilitate network access among various agents associated with a vehicle, could provide predetermined network access and billing, without regard to the particular agent or transaction.

In a vehicle that provides networking capabilities between entities inside the vehicle and the external world ("connected vehicle"), the amount of possible transactions and the changeability of agents associated with those transactions require a flexible framework to ensure security and appropriate network access. In a real-life scenario for a connected vehicle, multiple agents may use the vehicle and perform transactions on or via the vehicle over any given time period. Individual users such as, for example, an owner, a driver, a passenger, a temporary driver (e.g., borrower or renter), or a new owner of a used automobile, may use the vehicle as a personal computing and communication platform for navigational, recreational, and/or business-related purposes. A manufacturer of the vehicle may want to collect vehicle centric data from the vehicle and send firmware/software upgrades to the vehicle. Government entities may want to identify and locate the vehicle for law enforcement or government regulation (e.g., emissions controls) purposes. Vehicle dealers may want to obtain sensor data and other vehicle diagnostic information for maintenance updates and/or scheduling. Thus, a one-to-one exclusive mapping between an agent (e.g., a human or a device) and a connected vehicle does not exist.

In a contrasting example, a one-to-one mapping is typically provided between a mobile phone and a single user. In a mobile phone, credentials that bind the user and the device may be stored in a physical subscriber identity module (SIM) or provisioning module. Thus, if the mobile device is subsequently operated by a new user (e.g., someone borrowing the mobile phone), the credentials in the current SIM, associated with the original user, will be used to access a cellular network and to bill for the network access usage. Thus, the original user mapped to the mobile phone will be billed for any network usage fees incurred by the new user. In some cases involving the same service provider, the mobile phone can be provisioned with the new user's credentials by physically replacing the existing SIM hardware with a SIM of the new user. However, SIM swapping or identity reassignment across different service providers is often problematic or simply not feasible in a mobile phone.

In a connected vehicle, agents may change over any given period of time, and it may be impossible or impractical to physically switch a SIM in the vehicle or to make a trip to a service center each time a new agent needs network access to or from the vehicle. In one example, a manufacturer of an automobile may want to use a transaction application to collect real time data from sensors in the vehicle. If the automobile is manufactured in one country and shipped to another country (e.g., manufactured in Japan and shipped to the United States), then before the automobile is even purchased it would have traveled across international boundaries and multiple telecom service provider areas. Thus, if the manufacturer (i.e., the agent) provisions the automobile with credentials for a first service provider usable in the first country, the manufacturer may prefer a different service provider to be provisioned in the automobile once the automobile is shipped to another country.

Another example of possible agent changes in a vehicle includes owners, drivers, renters, and passengers of a vehicle. When an automobile is sold to a customer, the new owner needs access rights to various transactions (e.g., toll payments, gas and charging stations, Internet commerce, personal vehicle settings, etc.) provided by the vehicle. In addition, the new owner may need wireless access to networks and devices external to the vehicle using an appropriate service provider and a desired billing scheme. These access rights may need to change each time the vehicle is driven by a different driver (e.g., another person in the owner's family, a current renter of a rental car, etc.). In addition, if the vehicle is sold again, a new owner and associated drivers and passengers also need access rights and the previously existing access rights need to be removed from the vehicle. Finally, multiple agents may want to access the vehicle concurrently, such as a driver and one or more passengers of the vehicle who desire access rights to at least some of the vehicle transactions. For example, a passenger may want to use an Internet commerce transaction to download music or videos, or the passenger may want to pay for transportation costs, such as toll expenses and/or gas and charging station expenses.

Supporting a multi-agent and multi-transaction vehicular environment may also require more protection layers than typically used in traditional authentication schemes such as a simple user identification ("user ID") and password. In one example, additional protection layers may be necessary for certain transactions and agents to avoid compromising security (e.g., highly sensitive transactions such as transactions allowing modifications by a manufacturer of the vehicle itself) and/or regulatory compliance of a transaction. Thus, flexible agent identity management is needed with a strong authentication component that provides adequate security for dynamically changing agents and transactions, such that security, privacy, authenticity, accountability, and regulatory compliance are not compromised.

A system for enabling secure transactions in a vehicular environment using flexible identity management for agents associated with the transactions, outlined by FIG. 1, can resolve many of these issues. In accordance with one example implementation of communication system 10, a method is provided for agent identity management that is flexible, secure, and allows network access to be switched dynamically for different agents. The method provides for authenticating an agent to on-board unit (OBU) 30 of vehicle 4, provisioning an identity profile associated with the agent, and provisioning one or more virtual subscriber identity modules (VSIMs) associated with the agent. For a human agent, the identity profile can include individualized vehicle preferences (e.g., seat position, cabin temperature settings, radio or other media, navigation locations, etc.). Boundaries such as parental controls and transaction access controls may also be provided in an identity profile, which can be added by another agent having appropriate authority. The method also provides for verifying whether a particular transaction is authorized when the transaction is associated with the agent. For authorized transactions requiring remote network access to external devices, the method allows for opportunistic selection of network credentials, such as VSIMs, WiFi, etc., associated with the particular agent, which may be determined by evaluating the agent, the transaction, and a current geographical location of the vehicle. Thus, transactions are securely enabled for different agents by providing a dynamic identity framework for agents. In addition, network access can be opportunistically selected depending on one or more factors, including the agent, the transaction and the current location of the vehicle.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Turning to the infrastructure of FIG. 1, end user 2 can be associated with a human agent (e.g., a driver or passenger) having any type of relationship to the vehicle such as an owner, a renter, a temporary driver, a family member or friend of the owner, etc. End user 2 may initiate communication in communication system 10 via some network, and such communication may be initiated through any suitable device, inclusive of an in-vehicle mobile device 18a or 18b, display 28, and navigation system 17. In one embodiment, additional displays may be provided for one or more passengers in vehicle 4. In-vehicle mobile devices 18a-b are inclusive of mobile phones, smart mobile phones (smartphones), e-book readers, tablets, iPads, personal digital assistants (PDAs), laptops or electronic notebooks, portable navigation systems, multimedia gadgets (e.g., cameras, players, etc.), and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wired or wireless communication link and may be configured as a personal area network (PAN) or a wireless personal area network (WPAN) or any other appropriate architecture or system that facilitates communications in a network environment. Wired and wireless communication links may be inclusive of any electronic link such as Bluetooth, wireless technologies (e.g., IEEE 802.11x), a USB cable, an HDMI cable, etc. Connection between mobile devices and OBU 30 may be configured based on particular needs and logistics. In one particular example, an external mobile device may be connected to OBU 30 through a USB cable or wireless network when, for example, the external mobile device is a diagnostic tool used by a mechanic for servicing vehicle 4.

Networks 40 represent a series of points or nodes of interconnected communication paths for receiving and transmitting packets of information that propagate through communication system 10. Networks 40 offer communicative interfaces between any of the components of FIG. 1 and remote network nodes and other electronic devices (e.g., transaction systems 50, authorized entities 98, and other vehicles 59), and may be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x), satellite, cellular technologies (e.g., 3G, 4G, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks described herein. Such network interfaces 26 may be inclusive of multiple wireless interfaces (e.g., WiFi, WiMax, 3G, 4G, white space, 802.11x, satellite, Bluetooth, LTE, GSM/HSPA, CDMA/EVDO, DSRC, CAN, GPS etc.). Other interfaces represented by network interfaces 26, may include physical ports (e.g., Ethernet, USB, HDMI, etc.), and the like. Similarly, each of the network elements and user equipment (e.g., mobile devices) of communication system 10 can also include suitable interfaces for receiving, transmitting, and/or otherwise communicating data or information in a network environment.

OBU 30 can include one or more memory elements (e.g., memory element 24) for storing information to be used in achieving operations associated with the enablement of secure transactions using flexible identity management, as outlined herein. Any of the memory or storage items discussed herein should be construed as being encompassed within the broad term 'memory element' as used herein in this Specification.

In example embodiments, the operations for enabling secure transactions using flexible identity management outlined herein may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30 may include processing elements 21, including computing processor 22 and routing processor 23, that can execute software or algorithms to perform the activities to enable secure transactions, to use flexible identity management, and to route packets, using suitable routing protocols, associated with the secure transactions and identity management. A processor can execute any type of instructions associated with the data to achieve the operations detailed herein in this Specification. In one example, the processors (as shown in FIG. 1) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

Regarding a physical implementation of OBU 30, any suitable permutation may be applied based on particular needs and requirements, including the design of the particular vehicle in which OBU 30 is implemented. In example implementations, various components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., vehicle sensors, instruments, electronic control units (ECUs), embedded devices, actuators, etc.). OBU 30 may be implemented to provide one or more suitable communication interfaces (e.g., network interfaces 26) to legacy systems in vehicles such as, for example, a controller area network (CAN) a low speed network (LIN), a flexray communications protocol network, media oriented systems transport (MOST), and the like. Typically, multiple ECUs, with different embedded software, may be found in a single automobile and may communicate via a CAN bus. Sensors 14*a-b* may represent, for example, wheel and headlight sensors, respectively. Controls 16*a-b* may be inclusive of any embedded system or ECU that controls one or more of the electrical systems or subsystems in vehicle 4. Actuator 13 represents a vehicle setting device such as, for example, a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communications in a LIN bus, in one embodiment. Sensor 14*c* represents a type of sensor or device that may be configured for communications via flexray communications protocol (e.g., a radar collision sensor). Control 16*c*, representing one or more ECUs, may be suitably integrated for controlling the flexray network and sensors and other associated components. Additionally, OBU 30 may be implemented to provide one or more suitable communication interfaces (e.g., network interfaces 26) to an Internet Protocol (IP) network, user datagram protocol (UDP) network, or any other suitable protocol or communication architecture provided to enable network communication with machine devices in vehicle 4.

In this particular example, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, entertainment systems (e.g., speakers, radio, DVD, CD, etc.), and the like.

Figure 2:
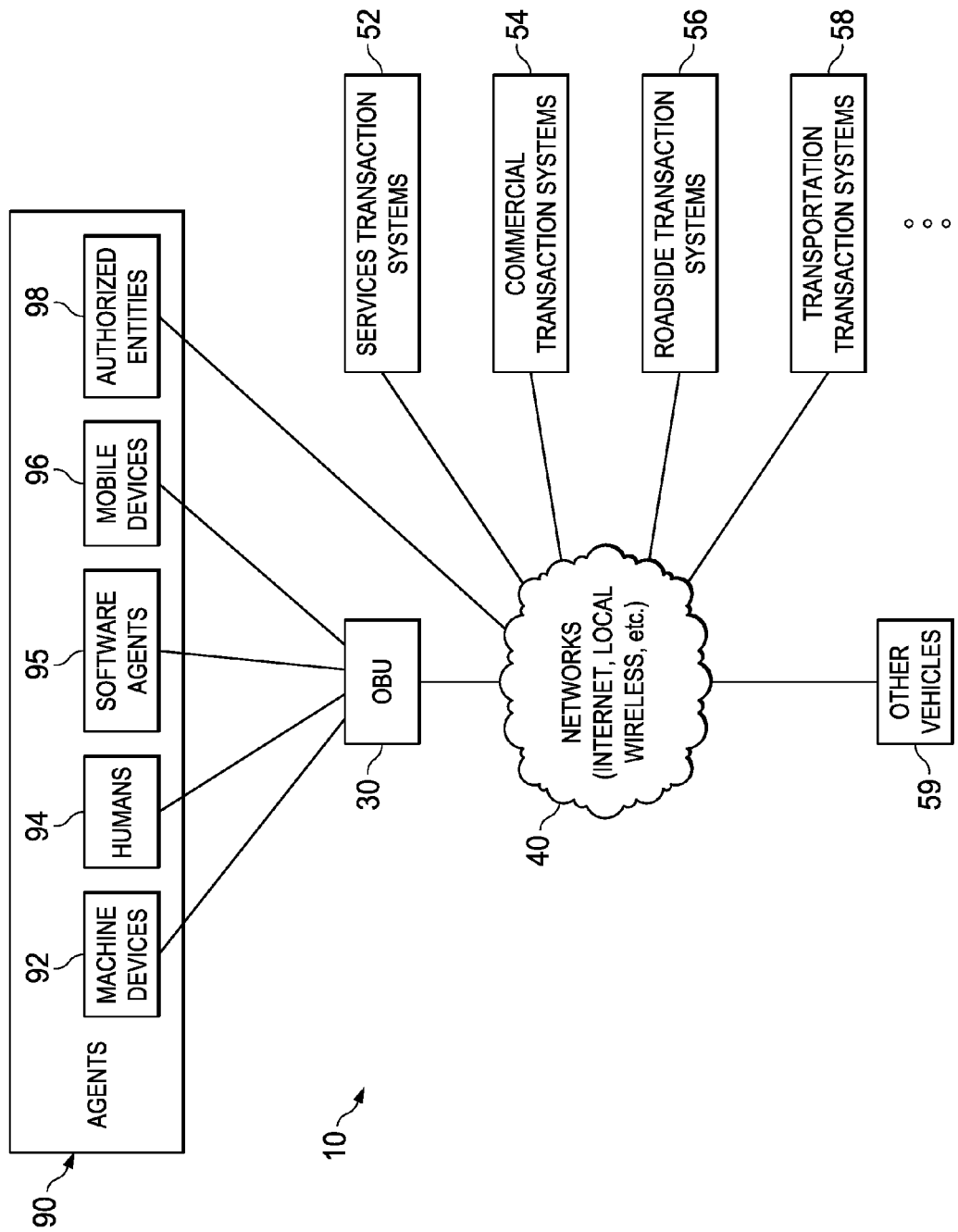
FIG. 2 is a simplified schematic diagram of the communication system in exemplary network environments associated with embodiments the present disclosure.

Turning to FIG. 2, communication system 10 is illustrated with OBU 30 shown coupled to agents 90 and networks 40. As previously discussed herein, agents 90 can include machine devices 92, humans 94, and mobile devices 96. In addition, agents can also include software agents 95 and authorized entities 98. Software agents 95 can include any executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A network node of such authorized entities will typically be remotely located from OBU 30 and, therefore, accessible from OBU 30 through networks 40 such as the Internet or other WANs and any available communication link (e.g., 3G, 4G, local wireless, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of directly accessing the manufacturer's network through a LAN or WLAN. Similarly, when a vehicle 4 is taken to a dealer for maintenance, the OBU 30 may connect to the dealer network through a communication link that does not include the Internet or any other wide area network.

Networks 40 may also facilitate communication between certain agents 90 (e.g., machine devices 92, humans 94, software agents 95, mobile devices 96) and transaction systems 50. By way of example, transaction systems 50 may include services transaction systems 52, commercial transaction systems 54, roadside transaction systems 56, and transportation transaction systems 58 on network nodes or other electronic devices. Each of the transaction systems can be associated with many different types of entities and many different transaction scenarios. Services transaction systems 52 can encompass numerous entities providing services such as identity service providers, mobile wireless service providers, banks and other financial institutions, location-based services (LBS), travel agencies, vehicle rental and leasing agencies, Internet websites, etc. In some implementations, however, a vehicle rental and leasing entity may be provisioned as an agent of the OBU, such as when the vehicle itself is owned by the rental and leasing entity. In this particular scenario, the rental and leasing agency could be an authorized entity of vehicle 4, and any authorized employees could be human agents of the vehicle. Commercial transaction systems 54 may include entities facilitating commercial transactions through the Internet (e.g., video and music download sites, online retailers, etc.), etc. Roadside transaction systems 56 may include various entities providing roadside services such as gas and electric charging stations, kiosks (both roadside and drive-through), etc. Transportation transaction systems 58 may include entities or devices facilitating vehicle charging transactions related to toll payments, ferry charges, bridge toll payments, parking, Vehicle Miles Traveled (VMT), and any other transportation costs incurred as a result of moving vehicle 4 from one location to another. The transaction systems 52, 54, 56, and 58, as categorized, are provided for purposes of illustration and ease of understanding, and it will be appreciated that certain entities may logically be included in multiple transaction systems (e.g., a bank could be described as both a services transaction system and a commercial transaction system) and that numerous types of transaction systems and entities other than those enumerated herein may also be possible.

Other commercial transactions may occur through OBU 30 by accessing other vehicles 59 (vehicle-to-vehicle commerce). An available network represented by networks 40, may provide a communicative pathway between vehicle 4 and other vehicles 59, where vehicle 4 includes OBU 30 and other vehicles 59 include a suitable communication device (e.g., mobile device, OBU or similar device). The communicative pathway between vehicle 4 and other vehicles 59 could be established as a single hop or multi-hop vehicle-to-vehicle network through WiFi, WiMax, or any other suitable wireless technologies allowing a sustained connection between vehicle 4 and other vehicles 59. Commercial transactions could occur between a mobile device in one vehicle (connected to an OBU) and an OBU in another vehicle, between mobile devices in separate vehicles with OBUs, or between OBUs of separate vehicles. Commercial transactions may also be conducted between OBU 30 and mobile devices 96 (vehicle-to-mobile device commerce), such as when a mobile device purchases content from OBU 30. Another type of commercial transaction can include in-vehicle commerce in which a user of a mobile device pays for the use of resources through OBU 30 (e.g., in the case of a passenger in a commercial vehicle such as a taxi cab) or when mobile devices within a vehicle use the network available through OBU 30 to conduct commercial transactions with each other. In addition to commercial transactions, these communicative pathways involving vehicles and mobile devices may also be established for any other suitable services or transactions, providing proper authentication and network credentials are obtained.

Figure 3:
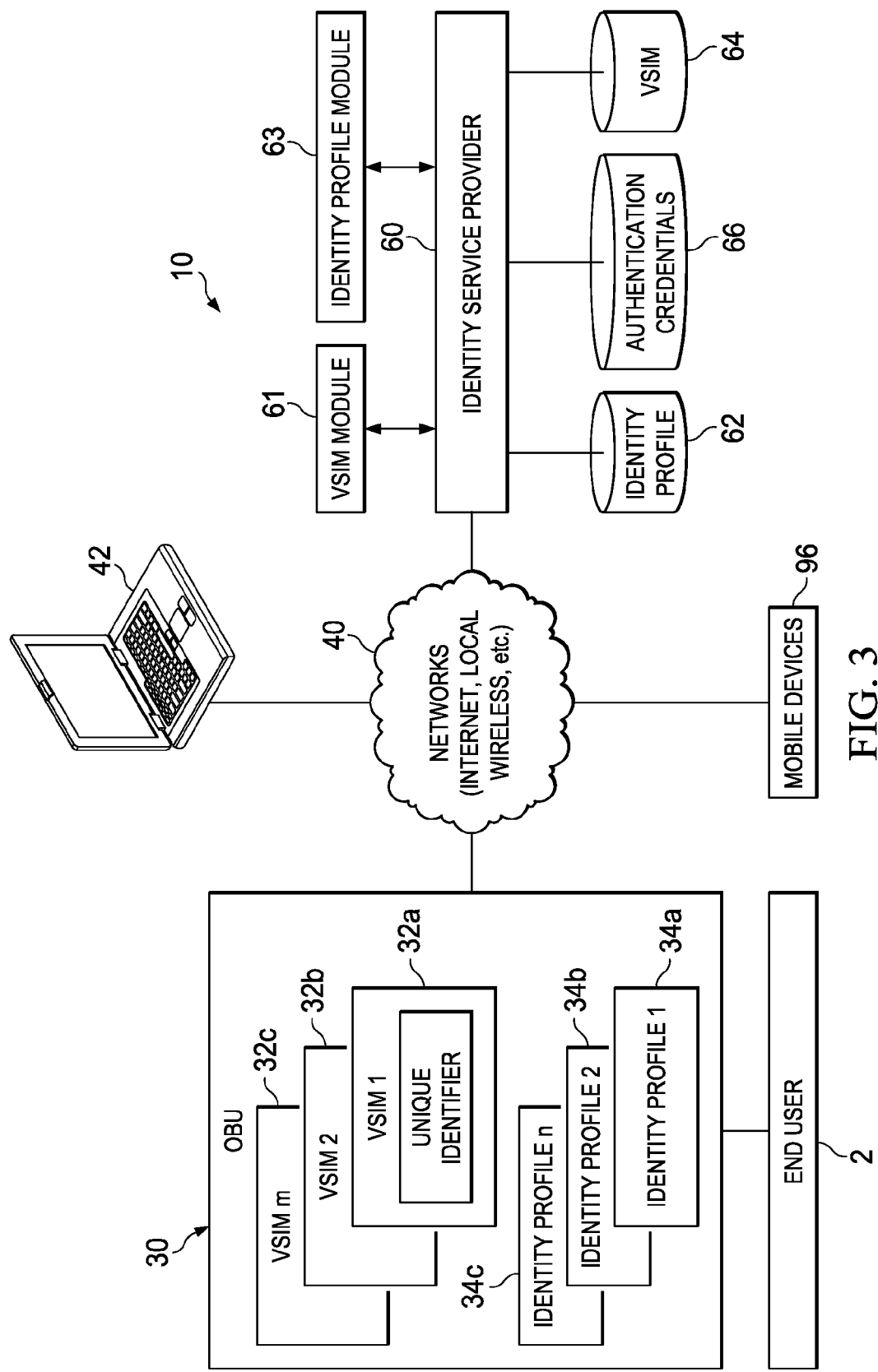
FIG. 3 is another simplified schematic diagram of the communication system in exemplary network environments associated with embodiments of the present disclosure.

Turning to FIG. 3, communication system 10 depicts a more detailed representation of certain elements of OBU 30, and of networks 40 providing a communication pathway to a particular service transaction system 52 (i.e., an identity service provider 60). In addition, end user computer 42 and mobile devices 96 are also shown with network access to identity service provider 60. In accordance with embodiments of the present disclosure, one or more virtual subscriber identity modules 32a, 32b, and 32c (referred to collectively herein as VSIMs 32) may be provisioned in OBU 30 for each agent authenticated to the OBU and having a subscription with a mobile network operator providing cellular services (e.g., AT&T, Verizon, T-Mobile, Sprint, PCS, etc.). VSIMs 32 each include a unique identifier or key 33 that identifies an agent on mobile telephony devices such as OBU 30. VSIMs 32 may also contain security authentication to authenticate the agent to the corresponding mobile network operator. In addition, one or more VSIMs 32 may be provisioned in OBU 30 for each agent of OBU 30, and multiple VSIMs for one or more agents can be stored in OBU 30 concurrently. Multiple VSIMs 32 provisioned in OBU 30 can enable flexible and opportunistic use of available mobile network operators to provide one or more network access links from OBU 30 to a remote node, and can also enable these network access links (i.e., communication pathways) on behalf of multiple agents using OBU 30 as a communication source.

In one embodiment, OBU 30 is equipped with a Universal Integrated Circuit Card (UICC) that allows for multiple universal subscriber identity module (USIM) applications to accommodate VSIMs 32. In this embodiment, one or more of VSIMs 32 having a desired mobile network operator may be opportunistically selected, if certain criteria are met, so that the desired one or more mobile network operators can be utilized for network access from OBU 30. In another implementation, multiple SIM cards may be connected to OBU 30 to accommodate a corresponding number of VSIMs. In this implementation involving multiple SIM cards, a software module could be configured to opportunistically select an appropriate one or more SIM cards corresponding to a desired one or more mobile network operators if certain criteria are met. In yet another implementation, VSIMs could be simply soft SIM information stored in a storage repository of OBU 30 such as part of an identity profile of a corresponding agent. Once downloaded, VSIMs 32 can reside in OBU 30 in accordance with whatever particular implementation is employed, until an expiration of the VSIM or until the VSIM is replaced, updated, or removed by an agent with appropriate authentication and authorization.

In accordance with embodiments of communication system 10, OBU 30 may also be provisioned with one or more identity profiles 34a, 34b, and 34c (referred to collectively herein as identity profiles 34), with each identity profile 34 corresponding to an agent that can authenticate to OBU 30. Identity profiles 34, as further detailed below, can include credentials and profile information for a particular agent. Credentials contain information that uniquely identifies an agent (e.g., a personal identifier (PID)) and that may be used for authentication purposes. Examples of credentials may include one or more of name, address, phone number, driver's license number, social security number, business license number, IP address, user ID/password, biometrics, personal device identifier (e.g., authentication information corresponding to key fob, access card, credit card, mobile phone, etc.), security keys, and certificates (e.g., public key infrastructure (PKI) certificate, trusted third party (TTP) certificate, etc.).

Profile information aggregates agent attributes, account information, preferences, and/or settings, which can enable appropriate transactions by authenticated agents. For example, profile information can include vehicle settings, dashboard preferences, wireless interface preferences (e.g., VSIM information, WiFi account information, etc.), web account information (e.g., multimedia, social networking, etc.), mobile device list (e.g., smartphones, mobile phones, tablets, laptops, etc.) including network configurations for mobile devices, network service provider membership account information, insurance information, credit card/payment account information, manufacturer web account information, network interface account information, GPS favorite locations, and phone contact list. The information included in a particular identity profile will be at least partially dependent upon the particular agent to which it corresponds. For example, an authorized entity (e.g., a manufacturer of the vehicle, etc.) would not need vehicle settings, GPS favorite locations, or multimedia information in its identity profile. In addition to agents, a profile identity may be provisioned for a vehicle itself including information to distinctly identity the vehicle (e.g., a vehicle identification number (VIN)). It will be apparent that the examples provided herein of credentials and profile information are not all-inclusive, and any other suitable information or data could be included as credentials or profile information.

Various implementations can accommodate identity profiles 34 in OBU 30. For example, in one embodiment identity profiles 34 are stored in dedicated hardware (e.g., physical SIM card, memory card, etc.). Software can be configured to virtually switch between different hardware or the hardware itself may be programmable to store different agent identity information over time. In another embodiment, identity profiles 34 are stored in a programmable storage module or virtual identity module that can store one or more identity profiles 34. Generally, identity profiles 34 may be kept in any suitable memory element, software, hardware, or in any other suitable component, device, element, or object where appropriate and based on particular needs. In addition, identity profiles 34 may be provided in any database, register, cache, queue, control list, or storage structure.

In example embodiments of the present disclosure, VSIMs 32 and identity profiles 34 may be provisioned and managed through one or more identity service providers, represented by identity service provider 60 in FIG. 3. In one embodiment, identity service provider 60 could be a third party provider (e.g., in the cloud) and could offer identity services to mobile network operators. In other embodiments, identity service provider 60 could be a mobile network operator, a vehicle manufacturer, a vehicle rental and leasing agency, a vehicle dealer, a government agency, or any other entity having an interest in managing identities associated with a vehicle over the life of the vehicle. Moreover, identity profiles 34 and/or VSIMs 32 can be managed through the same or different identity service providers. By storing a VSIM and/or an identity profile in a remote cloud, the VSIM and identity profile can be associated with an agent rather than to a particular vehicle. Consequently, a human agent (e.g., driver, passenger, owner, renter, etc.) can retrieve his VSIM and identity profile in any vehicle. Depending on the make/model of the vehicle, the human agent can leverage relevant parts of the identity profile for available features in virtually any vehicle.

Provisioning and managing an identity profile or VSIM through identity service provider 60 can be accomplished in various ways. In one scenario, a user could access identity service provider 60 through the Internet or other available network from computer 42 (e.g., home computer, publicly accessible computer, business computer, etc.) or mobile devices 96. Additionally, end user 2 could access identity service provider 60 by bootstrapping a communication link through OBU 30 (e.g., accessing a home WLAN through WiFi, using a preprogrammed VSIM in OBU 30, using another agent's VSIM already provisioned in OBU 30, etc.) In other scenarios, the identity service provider 60 may be accessed through a local network (e.g., manufacturer who is an identity service provider locally accessing provisioning modules of OBU 30 prior to shipping the vehicle, etc.) or other wireless networks (e.g., user accessing mobile network operator through a cellular network if the mobile network operator is its own identity service provider, etc.).

Identity service provider 60 may provide modules allowing the creation of an account with authentication credentials 66 (which may be saved for future access of the account) for an agent. A VSIM module 61 may be provided by identity service provider 60 to allow a user to provision a VSIM for an agent, with the VSIM being associated with a desired mobile network operator and stored, for example, in VSIM database 64. An identity profile module 63 may also be provided by identity service provider 60 to allow the user to provision an identity profile for the agent and to store the identity profile in, for example, identity profile database 62. In some scenarios, a user is the agent and provisions a VSIM and/or an identity profile for himself. In other scenarios, the user may provision a VSIM and/or an identity profile for another agent (e.g., a vehicle dealer provisioning a VSIM and/or an identity profile for a new vehicle owner, a vehicle rental agency provisioning a VSIM and/or an identity profile for an agent renting a vehicle, a user at an OEM provisioning a VSIM and identity profile for a software agent configured in the OBU to make network connections to the OEM from the OBU, etc.).

VSIM 32 and identity profile 34 may be dynamically added, removed, and updated via local or remote network access. After provisioning a VSIM and/or identity profile with identity service provider 60, the VSIM and/or identity profile may be downloaded using control channels or otherwise provided to OBU 30 if the agent associated with the VSIM and/or identity profile has been authenticated to OBU 30. In one example, to download VSIMs 32 and/or identity profiles 34, the agent (e.g., end user 2) may bootstrap a communication link in OBU 30 (e.g., WiFi, an available VSIM, etc.) to access identity service provider 60 using control channels through the Internet or other network. In another example, end user 2 may access a local network of an identity service provider if a vehicle is in close physical proximity to identity service provider 60. Once identity service provider 60 is accessed, the user can authenticate to identity service provider 60 via authentication credentials 66, access the desired account, and download one or more associated VSIMs 32 and/or identity profiles 34. Similarly, if a new VSIM for the same agent is provisioned or the identity profile is updated in identity service provider 60, then the associated agent can use an available VSIM or other available communication link in OBU 30 to access identity service provider 60 to download the new VSIM and/or updated identity profile. In another scenario, the VSIM and/or identity profile may be stored on a transportable memory element (e.g., USB stick, CD, etc.), which may be provided locally to OBU 30 by a user, such as end user 2. The VSIM and/or identity profile can then be downloaded to OBU 30 from the transportable memory element.

In other example scenarios, an identity profile may be dynamically created and managed (e.g., removed or updated) locally, directly through OBU 30. For example, OBU 30 may provide an identity profile creation tool through display 28 for a user to enter desired credentials and profile information and associate such information with an agent. In another embodiment, the identity profile creation tool may be accessible through a user's mobile device. In these scenarios, the identity profile would not be accessible through identity service provider 60 and could only be accessed in the particular vehicle containing the identity profile.

Figure 4:
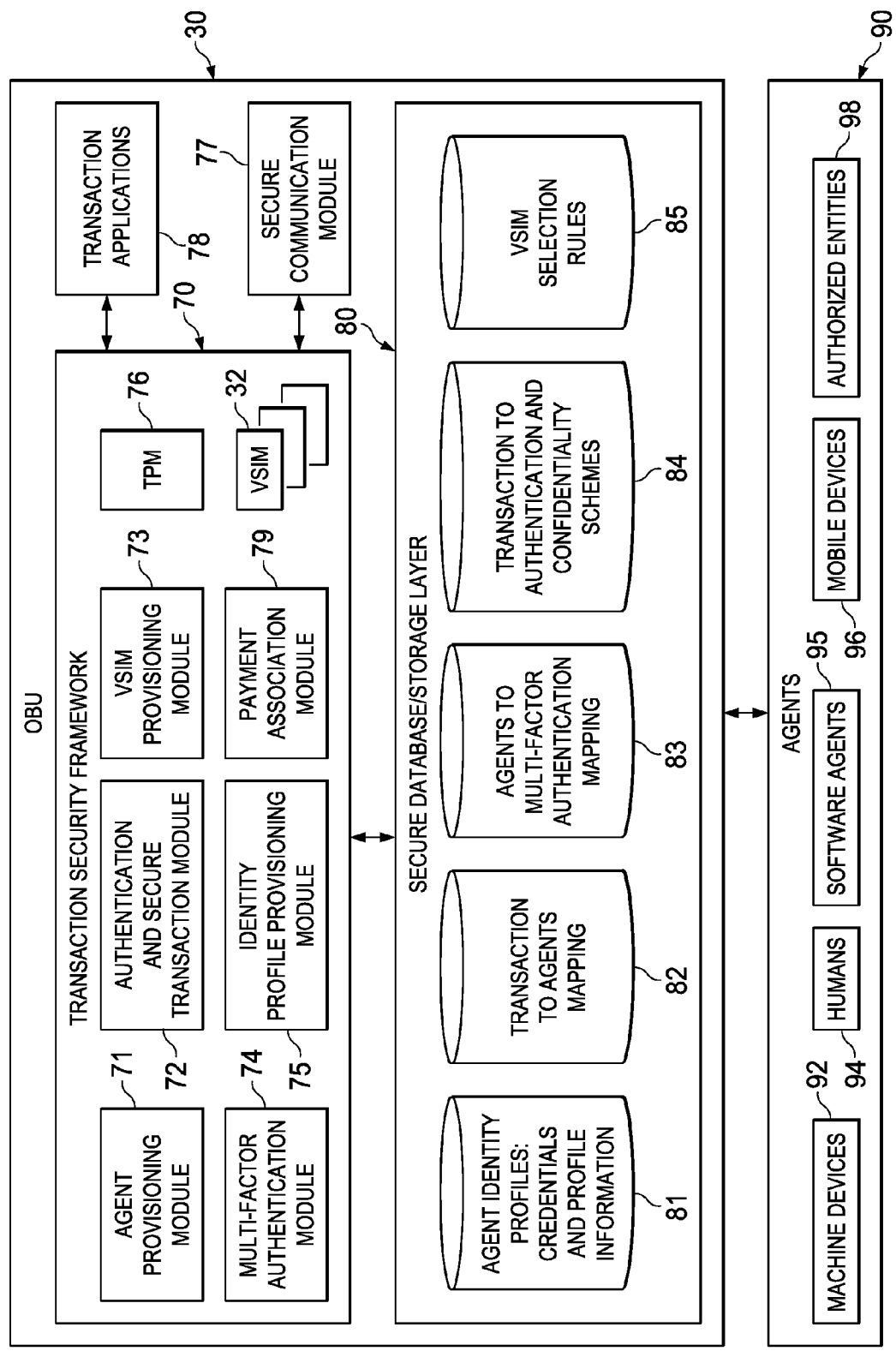
FIG. 4 is a simplified block diagram of an on-board unit of the communication system and possible agents of the on-board unit.

With reference now to FIG. 4, a block diagram illustrating an embodiment of the overall identity management and secure transaction processing architecture is shown. OBU 30 includes a transaction security framework 70, a secure database/storage layer 80, transaction applications 78, and a secure communication module 77. Transaction security framework 70 may include multiple software modules, VSIMs 32, and a trusted platform module (TPM) 76. The software modules can include agent provisioning module 71, authentication and secure transaction module 72, VSIM provisioning module 73, multi-factor authentication module 74, identity profile provisioning module 75, and payment association module 79.

Agent provisioning module 71 provides the overall flow for provisioning and authenticating an agent to OBU 30. Agent provisioning module 71 allows provisioning new agents, provisioning new and updated VSIMs 32, provisioning new and updated identity profiles 34, authenticating agents to OBU 30, and activating any applicable identity profiles 34. In addition, agent provisioning module may also invoke payment association module to determine whether to associate a payment method available through the agent (e.g., in the identity profile or through an associated VSIM) to certain transaction applications not typically initiated by an agent having a payment method (e.g., automatic toll payment transactions, automatic parking transactions, etc.)

Multi-factor authentication module 74 provides a flow for using one or more predefined authentication credentials to authenticate an agent to OBU 30 and to ascertain that the agent is authorized to conduct a particular transaction on OBU 30. In one embodiment, multi-factor authentication module 74 may be invoked upon initial authentication of an agent to gain access to OBU 30 and in addition, when particular transactions are initiated on OBU 30. Authentication credentials may include who, what, and where criteria related to the agent. By way of example, authentication requirements for machine devices and some mobile devices could include one or more of machine hardware signature, challenge-response, predefined certificate (e.g., PKI certificate, TTP certificate, etc.), and physical location relative to OBU 30. Authentication requirements for a human agent 94 (accessing OBU 30 through a mobile device or directly through a user interface such as display 28) could include one or more of biometrics, (e.g., fingerprinting, etc.), challenge-response, key fob, access card, mobile phone, user ID and password, a one-time password (OTP), and physical location relative to OBU 30. Authentication requirements for authorized entities could include challenge-response, predefined certificate, and the like.

In one embodiment, the authentication requirements for each agent may be provided in an agents-to-multi-factor mapping database 83 of secure database/storage layer 80. In some embodiments, the predefined authentication credentials that are required to authenticate to OBU 30 are specific to the particular agent being authenticated. For example, a key fob may allow an owner agent to authenticate to a vehicle, but only a simple user name and password may be required for a child of the owner to authenticate. In this case, a lesser amount of security may be required for the child to authenticate because the child may have limited access to transaction applications and resources of OBU 30. Furthermore, authentication requirements to gain access to OBU 30 may be different than authentication requirements for a particular transaction. By way of example, an owner of a vehicle may only need to use a key fob to gain access to OBU 30, but additional authentication may be required for the owner to access various transaction applications and resources of OBU 30. Security can be strengthened as the number and diversity of authentication requirements mapped to a particular agent is increased.

Implementation of the authentication requirements can be accomplished with any appropriate hardware and/or software. For example, TPM 76 is a hardware approach that can authenticate an agent, once the agent has provided appropriate credentials. TPM 76 is a secure processor that performs cryptographic functions and can store cryptographic keys for protecting information. In another embodiment, a software container (e.g., a secure virtualized operating system container) could be provided with appropriate authentication logic to authenticate an agent once credentials are provided. Thus, any hardware, software, or suitable combination thereof can be implemented to accomplish the authentication requirements of multi-factor authentication module 74.

TPM 76 can also be used to protect data and transaction applications. For data, TPM 76 can be a safe store for an encryption key so that only an authorized agent who properly authenticates to TPM 76 can access the encryption key to decrypt protected data (e.g., data in secure database/storage layer 80). TPM 76 can also be used to ensure the integrity of transaction applications 78 executing on OBU 30, which can be achieved locally or remotely depending on the particular transaction application and associated agent. Locally, the OBU 30 can self-ensure that the operating system is on a trusted platform. Transaction applications 78 may each include a signature that can be verified prior to execution. Transaction applications 78 can also be verified remotely to third parties, such as authorized entities 98. For example, an authorized entity such as a manufacturer may access a transaction application that monitors the brakes and accelerator of vehicle 4. Before the transaction application executes, TPM 76 can be used to verify the integrity of the application to the manufacturer. Based on the information provided, the manufacturer can respond accordingly (e.g., process data received from the transaction application if the transaction application is verified, cease execution of the transaction application if the transaction application is not verified).

In one embodiment, TPM 76 has a permanent identity associated with vehicle 4 and does not change even if vehicle ownership changes. Similarly, a vehicle identity (vehicle ID) of vehicle 4, such as a vehicle identification number (VIN) is also a permanent identity associated with vehicle 4. A TPM endorsement key, which can be used to encrypt data, may have a public key part that can be used as a TPM identifier (TPM ID). Although vehicle ID and TPM ID do not ordinarily change, if TPM 76 or OBU 30 is replaced during the life of vehicle 4, then a new TPM ID would need to be associated to vehicle 4.

VSIM provisioning module 73 and identity profile provisioning module 75 allow the provisioning of new or updated VSIMs and or identity profiles on OBU 30. Such provisioning may include downloading new or updated VSIMs and identity profiles from an identity service provider either locally or remotely. Provisioning may also include downloading new or updated VSIMs and identity profiles from a transportable memory element or mobile device. In addition, identity profiles may also be manually created in OBU 30, without involving an identity service provider.

Authentication and secure transaction module 72 provides a flow for detecting an event for a transaction, determining whether the transaction is authorized, authenticating an associated agent if required, and obtaining network credentials and other profile information as needed. Network credentials may include one or more VSIMs' information, user ID and password, and/or security certificates (e.g., asymmetric/symmetric key pair, etc.), and any other information to facilitate vehicle internal network access or external network access via an available wired or wireless communication link. In order to perform necessary authentication and evaluations to ensure secure transaction processing, this module may be configured to query secured storage such as transaction-to-agents mapping database 82, transaction-to-authentication-and-confidentiality-schemes mapping database 84, agents-to-multi-factor-authentication mapping database 83, and agent identity profiles database 81. As used in this Specification, a mapping of data, elements, objects, or components is intended to mean an electronic association, correspondence, relationship, or correlation between the data, elements, objects, or components, provided in electronic devices and/or networks. In one embodiment, these databases, in addition to any other databases or memory elements in secure database/storage layer 80, can be maintained in a secure manner using the default security credentials obtained from TPM 76. Moreover, various confidentiality schemes can be used to protect the data stored in the various memory elements of secure database/storage layer 80 such as, for example, cryptographic algorithms including Data Encryption Standard (DES/3DES), Secure Hash Algorithm (SHA-1/2), Advanced Encryption Standard (AES), etc.

Transaction-to-agents mapping database 82 indicates which transactions are authorized for which agents. Mapping database 82 may include mappings of agent identities to user-level and system-level transaction applications corresponding to transactions and also to types of transactions (e.g., transactions requiring remote network credentials, transactions requiring payment information, etc.). Thus, once an agent has authenticated to OBU 30, only transaction applications that are mapped to the agent, or that correspond to a type of transaction that is mapped to the agent, are authorized and accessible to the agent. Example mappings that could be found in database 82 include: 1) a manufacturer mapped to transaction applications for accessing vehicle sensor data (e.g., in order to perform diagnostics), for performing software or firmware upgrades, and for accessing a "black box" of the vehicle, 2) a dealer mapped to transaction applications for accessing sensor data (e.g., read only access in order to schedule maintenance services), 3) an emergency service provider mapped to transaction applications for controlling the vehicle (e.g., opening a vehicle door, disabling a vehicle engine, etc.), 4) a public entity mapped to transaction applications for accessing sensor data or other vehicle diagnostic data (e.g., for inspection, security, surveillance, etc.), 5) an owner of the vehicle mapped to all transaction applications except those allowing "write" or "modify" access to vehicle software and/or firmware, 6) a passenger mapped to a subset of transaction applications and features available to an owner of the vehicle, and 7) a sensor mapped to a transaction application compiling diagnostic data.

Additionally, different agents may have different levels of authorization. For example, a dealer may only need to read vehicle sensor data for maintenance scheduling purposes. Consequently, the dealer would be mapped to a transaction application that only allows read operations of vehicle sensors to be performed. On the other hand, a manufacturer may need to read and update vehicle sensors and controls for performing firmware and/or software upgrades and fixes. Therefore, the transaction applications mapped to the manufacturer could allow read and update functions to be performed.

In one embodiment, a software agent may be a system-level transaction application that does not have a separate agent initiating its execution or otherwise associated with it. For example, the software agent could be a low level application that automatically initiates processing based upon predefined criteria (e.g., specific time periods, whenever network connectivity is detected, etc.). Accordingly, authorization for the software agent to execute could be provided in any suitable way, including an appropriate indication in transaction-to-agents mapping database 82 (e.g., mapping the software agent to a type of transaction, mapping the software agent to itself).

Authentication and secure transaction module 72 may also determine which authentication and confidentiality schemes to use for particular transactions for exchanging data between OBU 30 and transaction systems in the cloud. Examples of authentication protocols that can be used include secure socket layer (SSL), Internet Protocol Security (IP SEC), Extensible Authentication Protocol (EAP-*), Hypertext Transfer Protocol Authentication (HTTP Auth), Kerberos, Simple Authentication and Security Layer (SASL), Web Service Security (WS-Security), etc. Examples of confidentiality schemes that can be used include encryption or cryptographic algorithms such as DES/3DES, SHA-1/2, AES, etc. Accordingly, transaction-to-authentication-and-confidentiality-schemes mapping database 84 may provide a mapping of which types of transactions and particular transaction applications require which authentication and confidentiality schemes. One example database mapping could be a banking application's related data and other sensitive information mapped to a desired encryption mechanism. Furthermore, in certain implementations, the criticality of the communication may dictate the applicable authentication method (e.g., different types of authentication may be required for highly sensitive transaction applications). In some embodiments, mapping database 84 may also indicate which types of transactions and particular transaction applications require multi-factor authentication to be performed for an associated agent.

In scenarios in which multi-factor authentication is required for an agent, authentication and secure transaction module 72 may also access agents-to-multi-factor-authentication mapping database 83. For example, a human agent 94 accessing benign features such as gaming, video, and the like may require a simple user name and password during the initial authentication to OBU 30. However, once the human agent 94 decides to access a banking transaction application, additional authentication (e.g., physical presence in the form of biometric authentication, etc.) may be required. In another example, highly critical functions such as software/firmware changes by a manufacturer, or emergency services by an emergency service provider, may require multiple layers of authentication by the manufacturer or emergency services provider. These multiple layers of authentication could be satisfied by the agent in the initial authentication to OBU 30, or additional required layers may need to be satisfied when the agent initiates access to the particular transaction application requiring the additional authentication.

Secure database/storage layer 80 may also provide an agent identity profiles database 81, for storing identity profiles 34 provisioned locally (e.g., using a transportable memory element to download an identity profile, creating an identity profile directly through OBU 30) or remotely (e.g., downloading an identity profile from identity service provider 60). In addition, agent identity profiles database 81 may also include security keys, certificates, and credentials corresponding to various transaction applications and agents.

Secure communication module 77 of OBU 30 may enable secure communication to various networks (e.g., networks 40 as shown in FIGS. 1-3). Secure communication module 77 selects secure and authenticated network access for an agent and associated transaction application. In addition, secure communication module 77 may also provide opportunistic selection of a VSIM available to the agent, when multiple VSIMs are available for use. VSIM selection rules database 85 may be configured to provide a pre-specified mapping of rules that represent preferences regarding which single VSIM, multiple VSIMs, and/or other wireless communication option (e.g., WiFi) to select for network access. In one embodiment, rules may include combinations of an agent, a transaction application (or type of transaction), and/or a geographical location of the vehicle mapped to a VSIM or other wireless communication. Examples of such rule combinations include agent and transaction application, agent and location, or agent, transaction application, and location. For illustration purposes, if an agent and transaction application combination is mapped to a VSIM, then the VSIM will be used when the agent and transaction application are associated with a network access request, regardless of where the vehicle is physically located. If an agent and location combination is mapped to a VSIM, then the VSIM will be used if the vehicle is physically located in the mapped location and if the agent is associated with the network access request, regardless of which particular transaction application is associated with the network access request.

Multiple VSIMs and/or other wireless communication options can also be mapped to transaction applications or types of transactions, agents, and/or geographical locations to allow a network connection to be split among the designated multiple VSIMs and/or other wireless communication options. In one example scenario, a large file download may utilize multiple VSIMs (e.g., two different 3G mobile networks) in order to split the file to increase the speed of the download. To accomplish this, a transaction application and agent associated with the file download may be mapped to two or more VSIMs provisioned in OBU 30 for the agent.

In certain scenarios, one VSIM may be preferred over another VSIM due to the vehicle location because of the mobile network operator rate. To illustrate this case, assume Agent X and California are mapped to VSIM 1 and Agent X and New York are mapped to VSIM 2. If Agent X is traveling in California, then VSIM 1 will be used for any network access requested by Agent X. If Agent X is traveling in New York, then VSIM 2 will be used for any network access requested by Agent X. In another scenario, a human agent 94 may prefer to have particular types of transactions tied to different VSIMs or combinations of VSIMs (e.g., home transactions mapped to VSIM 1, work related transactions mapped to VSIM 2, child's transactions mapped to VSIM 1). Such mappings can be configured in VSIM selection rules mapping database 85 with appropriate authorization. The VSIM selection rules mapping could also be provided in any other suitable memory element including, for example, an identity profile associated with the agent. In this alternative implementation, only transaction application and/or location may need to be mapped to available VSIMs and/or other wireless communication options.

In addition to pre-specifying VSIM selection rules, VSIMs may also be opportunistically selected in real-time. A real-time VSIM selection may occur based on current network conditions/demands, mobile network rate plan of an agent, remaining data/minutes of a mobile network rate plan. In addition, network performance characteristics such as, for example, data rate, signal level, congestion, etc. may also be evaluated in real-time and used to opportunistically select a suitable one or more VSIMs, other wireless communication options, or any suitable combination thereof.

Transaction applications 78 represent a plethora of user-level and system-level transaction applications that may be configured on OBU 30. With proper authentication to OBU 30 and authorization through transaction-to-agents mapping database 82, however, numerous types of transactions using transaction applications 78 may be performed through OBU 30. Generally, types of transactions are inclusive of 1) accessing one or more wireless/mobile/cellular networks and using network bandwidth and services, 2) gaining access to various resources of the vehicle based on an identity profile and/or associated databases, 3) gaining access to applications in the vehicle, and 4) engaging in commercial activities (e.g., paying for receiving goods or services, or receiving payment for selling goods or services). These general transactions may overlap in certain cases, for example, where an agent accesses a cellular network in order to connect to an online retailer (e.g., commercial transaction system 54) in order to pay for purchased goods, and uses an Internet commerce transaction application to enable a secure transaction.

The user-level and system-level transaction applications of OBU 30 may be mapped to any appropriate agent 90 (e.g., machine devices 92, humans 94, software agents 95, mobile devices 96, and authorized entities 98) in transaction-to-agents mapping database 82. Example transaction applications 78 can include applications facilitating external network access such as banking applications, LBS applications, travel agency applications, vehicle rental & leasing agency applications, Internet commerce applications, kiosk applications, gas & electric charging applications, transportation charging applications, vehicle-to-vehicle applications, vehicle-to-mobile applications, dealer transaction applications, OEM transaction applications, and the like. Other transaction applications 78 may include hardware and/or software applications involving internal access of OBU 30 such as gaining access to various resources, vehicle subsystems, or software applications not involving remote network access. A unified identity management framework, as illustrated in FIG. 4, is capable of aggregation and association of all agents 90 and transaction scenarios into a unified system. In one embodiment, application programming interfaces (APIs) may be exported to integrate these agent identities with various transaction applications.

Authorized entities 98 may access appropriate transaction applications (e.g., dealer transaction application, OEM transaction application, etc.) after gaining access to OBU 30 through an authenticated software agent 95. The software agent 95 may first authenticate to OBU 30 and can then establish a network connection to the authorized entity using an appropriate VSIM (e.g., the manufacturer's VSIM). The authorized entity to which the software agent establishes a network connection may need to authenticate to OBU 30 before being able to access transaction applications on OBU 30, such as transactions applications related to vehicle sensor data, diagnostic data, firmware/software upgrades, emissions data, etc. Thus, for example, an OEM software agent on OBU 30 may be configured to establish a network connection to the OEM whenever internal connectivity to a network is detected on OBU 30. OEM software agent may first authenticate to OBU 30 and, for example, VSIM 1 may be selected for network access. Once a network connection is established between OBU 30 and the OEM using VSIM 1, the OEM may update the VSIM 1 to VSIM 2 if, for example, the OEM has negotiated a new rate with a different mobile network provider and wishes to update its VSIM. In some embodiments, a VSIM being updated (e.g., VSIM 1) may need to remain active and available for use by the associated agent for a specified period of time, until the new VSIM (e.g., VSIM 2) has been successfully provisioned (and possibly tested) in OBU 30. Additionally, the OEM may need to be authenticated to OBU 30 and authorized in transaction-to-agents mapping database 82 in order to update the VSIM or to access an OEM transaction application (e.g., one of transaction applications 78), which could be configured to access various vehicle components (e.g., vehicle sensors, vehicle firmware/software, etc.).

Machine devices 92 may also authenticate to OBU 30 and then provide an automatic network connection to an external entity or transaction system 50. For example, a machine device agent (e.g., a detector) may sense a toll system and initiate a transportation charging application. After the detector is authenticated to OBU 30, transaction-to-agents mapping database 82 may be evaluated to determine whether the detector is mapped to the transportation charging application. Once the detector is determined to be authorized to access the transportation charging application, network credentials and payment information may be obtained so that transportation charging application can connect to the toll system and provide appropriate payment.

Figure 5:
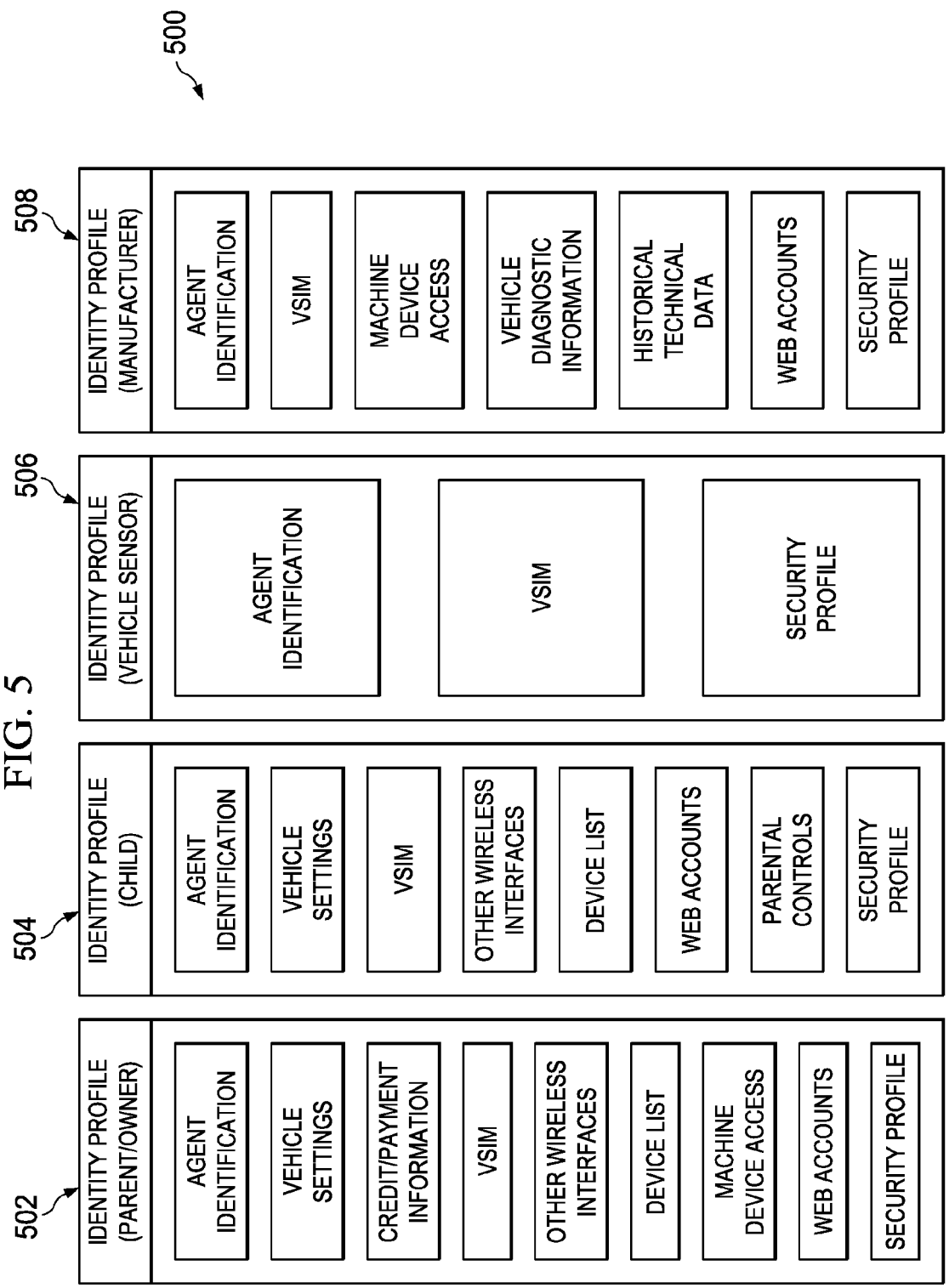
FIG. 5 is a block diagram of a plurality of identity profiles in an example scenario of the communication system.

Turning to FIG. 5, an example selection of identity profiles that could be provided in an OBU is illustrated. Identity profiles are included for a parent/owner 502, a child 504, a vehicle sensor 506, and a manufacturer 508. Common elements in each of the identity profiles include agent identification, VSIM, and security profile. Agent identification could include credentials information such as a key fob for the parent/owner 502, a birth date for the child 504, a device identifier for the vehicle sensor 506, and a name for the manufacturer 508. The security profile information could also be credentials such as a user name and password for the parent/owner 502 and child 504, a security key for the vehicle sensor 506, and a PKI certificate for the manufacturer 508.

Identity profiles for human agents, such as parent/owner 502 and child 504 may also include vehicle settings, other wireless interfaces, device list, and web accounts. The vehicle settings may include items such as preferred seat positions as a driver and a passenger, temperature controls, music or radio settings, and the like. Other wireless interfaces and preferences may include, for example, a WiFi account established with a mobile network provider. Wireless interface information can be included in the identity profiles so that whenever the vehicle is near a hotspot of the mobile network operator, network connections by the parent/owner or child can be made through the WiFi interface. Identity profiles for the parent/owner 502 and child 504 may also include specific web accounts, such as those related to social networking and media.

Device lists may include any personal mobile devices of the parent/owner or child. The device list could include network interface accounts, passwords, and network configurations. Thus, the device list is essentially an identity profile for mobile devices within identity profiles of the parent/owner 502 and child 504. The device list information is provided to allow each of the identified mobile devices to be recognized and connected to the OBU 30 and to other networks in a desired manner. For example, if the child wants to download a movie from the Internet to a mobile device (e.g., a laptop, iPad, etc.) and the mobile device is included in the device list of the child's identity profile 504, then the mobile device could be connected to OBU 30 through a local wireless connection and OBU 30 could route traffic to the Internet through appropriate and available network connections from OBU 30 to the Internet (e.g., using a VSIM identified in the identity profile of the child 504). Thus, OBU 30 may be used as a communication link to the Internet for mobile devices identified in a device list of an identity profile of another agent.

Identity profile of parent/owner 502 may also include other profile information of a sensitive nature such as credit/payment information. Credit/payment information may be included in an identity profile to allow the agent of the identity profile to use his own credit/payment information for various charges/payments incurred during commercial transactions (e.g., transportation charging, gas and charging stations, kiosks, Internet commerce, rental and leasing, travel, etc.). The credit/payment information may be associated with authorized transaction applications during provisioning of the identity profile or at other times. By way of example, during the provisioning of an identity profile of an owner of vehicle 4, the owner's credit/payment information may be set as the default credit/payment method for various transaction applications. In a further example, payment information associated with transaction applications for transportation and gas and charging systems could be changed during a trip in vehicle 4 when a passenger offers to use his own credit/payment information to pay for such expenses. OBU 30 could provide an interface to allow modification to appropriate settings to effect such a change using proper authentication and authorization. In another example, each time a driver is authenticated to vehicle 4, the driver's credit/payment information may be associated with the various transportation and gas and charging transaction applications. However, if the driver is not the default payer/creditor, then OBU 30 could provide confirmation screens to notify the driver that his credit/payment information will be used and to receive confirmation and approval of this change.

Identity profile of parent/owner 502 may also include machine device access. While a manufacturer or an OEM may have access to vehicle machine devices to read and update or modify firmware or software of such machine devices, an owner of a vehicle may only be allowed to retrieve data from vehicle sensors. Accordingly, machine device access can indicate which machine devices the owner is authorized to access and what type of access is allowed. In addition, other passengers may not be allowed any type of access to the vehicle sensors and actuators, for example, and therefore, machine device access information may be omitted from identity profiles associated with other human agents.

Identity profile of child 504 may also contain parental controls and may not contain certain information that allows use of particular resources or transactions. Parental controls may be included to allow a parent to set desired limits on a child's use of OBU 30 resources and the vehicle itself. For example, any type of common computer parental controls related to accessing networks such as the Internet could be provided in parental controls. In addition parental controls could relate to particular activities of the vehicle. For example, if the child is authenticated as a driver, parental controls could require a notification be sent to the parent (e.g., via an email account, a text message, to a messaging center of the OBU 30, etc.) if the vehicle is driven beyond a specified boundary or perimeter or if the vehicle is driven beyond a specified speed. Parental controls could also be configured to limit certain vehicle functions (e.g., vehicle speed, entertainment systems, etc.). In addition, identity profile of child 504 may not have credit/payment information if the child is not allowed to engage in commercial transactions through OBU 30.

Identity profile of manufacturer 508 may also include machine device access information, which can indicate which machine devices the manufacturer is authorized to access and what type of access is allowed. In addition, the identify profile of manufacturer 508 may also include information related to diagnostics of vehicle 4 and a history of vehicle technical problems. Thus, when the manufacturer accesses vehicle 4, valuable historical information related specifically to vehicle 4 can be readily available for the manufacturer. Web accounts may also be provided in identity profile of manufacturer 508. Such information could allow the manufacturer to communicate with the driver/owner and provide information including, for example, marketing information such as coupons or sales events.

Turning to FIGS. 6 through 15, simplified flowcharts illustrating various aspects of embodiments of the present disclosure are shown. For ease of reference, FIGS. 6-15 will be described herein with reference to various elements, objects, modules, and components of the present disclosure as provided in preceding FIGS. 1-5.

Figure 6:
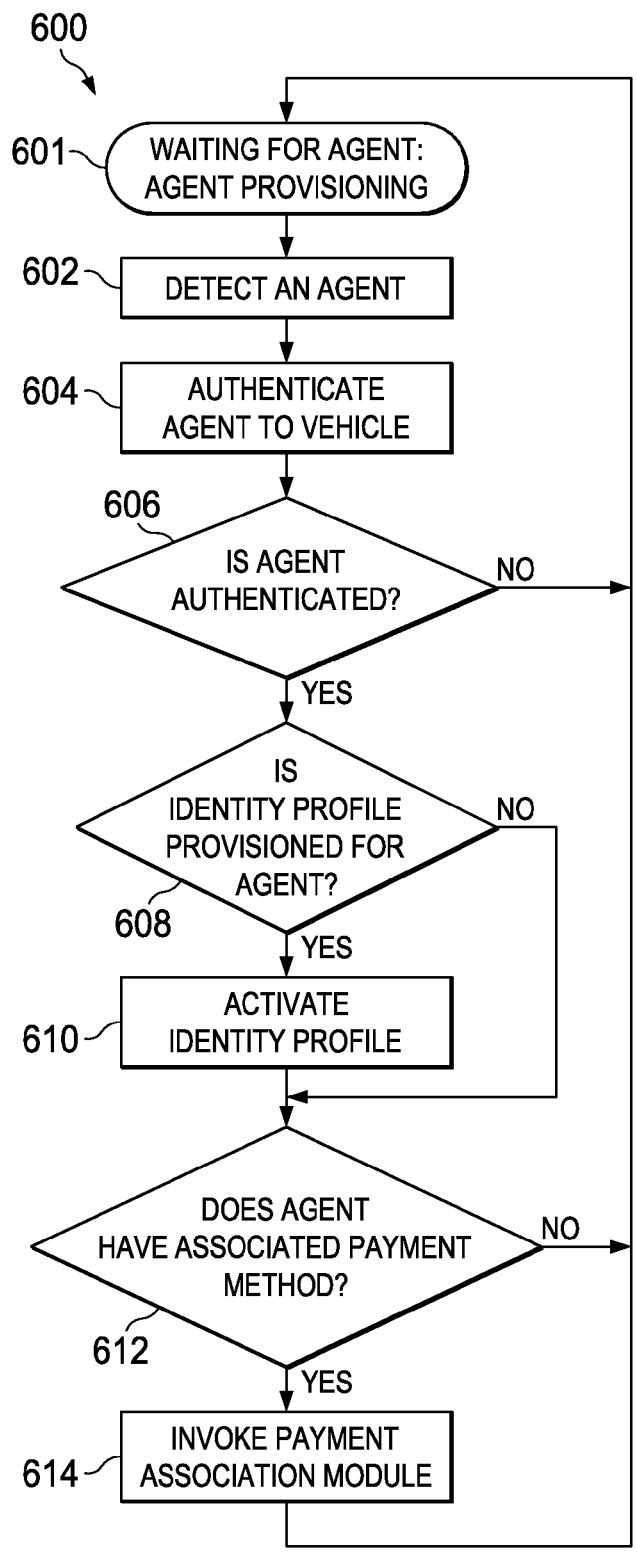
FIGS. 6-15 are simplified flowcharts associated with possible activities associated with the communication system of the present disclosure.

FIG. 6 is a simplified agent provisioning flow 600 providing example steps of agent provisioning module 71 for provisioning an agent to OBU 30, which may be configured as a background process open and running whenever OBU 30 is booted up. Agent provisioning flow 600 begins at step 601, waiting for an agent. When an agent attempts to gain access to OBU 30, flow moves to step 602 and an agent is detected. This can occur whenever a new or existing agent initiates a vehicle-based transaction via OBU 30. For example, when a human 94 (e.g., an owner, a renter, a borrower, etc.) enters a vehicle such as vehicle 4 and OBU 30 is powered on (e.g., by using a key fob to enter the vehicle, by starting the vehicle or otherwise providing power to OBU 30). Agent provisioning flow 600 may also occur when a mobile device 96 is powered on within vehicle 4, when a software agent 95 is initiated, when a machine device 92 is activated (e.g., by powering on vehicle 4) or attempts to access resources or transaction applications of OBU 30 (e.g., vehicle sensor or actuator sending data or information to OBU 30, detector initiating a transportation transaction application after detecting proximity to a toll system), when an authorized entity 98 attempts to access OBU 30 (e.g., after a corresponding software agent 95 has established network access to the authorized entity 98 from OBU 30). Furthermore, agent provisioning may also occur when a human agent provisions another agent (e.g., machine device, software agent, mobile device, authorized entity), typically for the first time.

Once an agent has been detected in step 602, flow passes to step 604 to perform authentication of the agent to the vehicle, which will be described in more detail with reference to FIGS. 7-10. During the authentication, VSIMs and/or an identity profile may be provisioned for the agent if the agent is properly authenticated. Flow then passes to decision box 606 where a determination is made as to whether the agent was properly authenticated to the vehicle. If the agent was not properly authenticated then flow passes back to step 601 to wait for another agent. If the agent was properly authenticated as determined in decision box 606, however, then flow passes to decision box 608 to determine whether an identity profile is provisioned for the agent. If the agent has a corresponding identity profile, then flow passes to step 610 to activate the identity profile, including determining agent priority and role in the vehicle, adjusting vehicle settings, configuring agent preferences, and the like, which will be further described herein with reference to FIG. 11.

After the identity profile is activated in step 610, or if the agent does not have a corresponding identity profile in OBU 30, then flow passes to decision box 612 to determine whether the agent has an associated payment method (e.g., payment method information in identity profile, VSIM that can be used for payment). If the agent has an associated payment method, then flow passes to step 614 to invoke payment association module, which will be further described with reference to FIG. 12. After the payment association processing is completed in step 614, or if the agent does not have an associated payment method as determined in decision box 612, then flow passes back to step 601 to wait for another agent. Certain agents (e.g., vehicle machines such as a brake sensor or a seat actuator, a human agent without payment information in an identity profile, etc.) may not have associated payment methods because these agents may not engage in commercial transactions through OBU 30 and, therefore, may not interact with transaction applications requiring payments.

Figure 7:
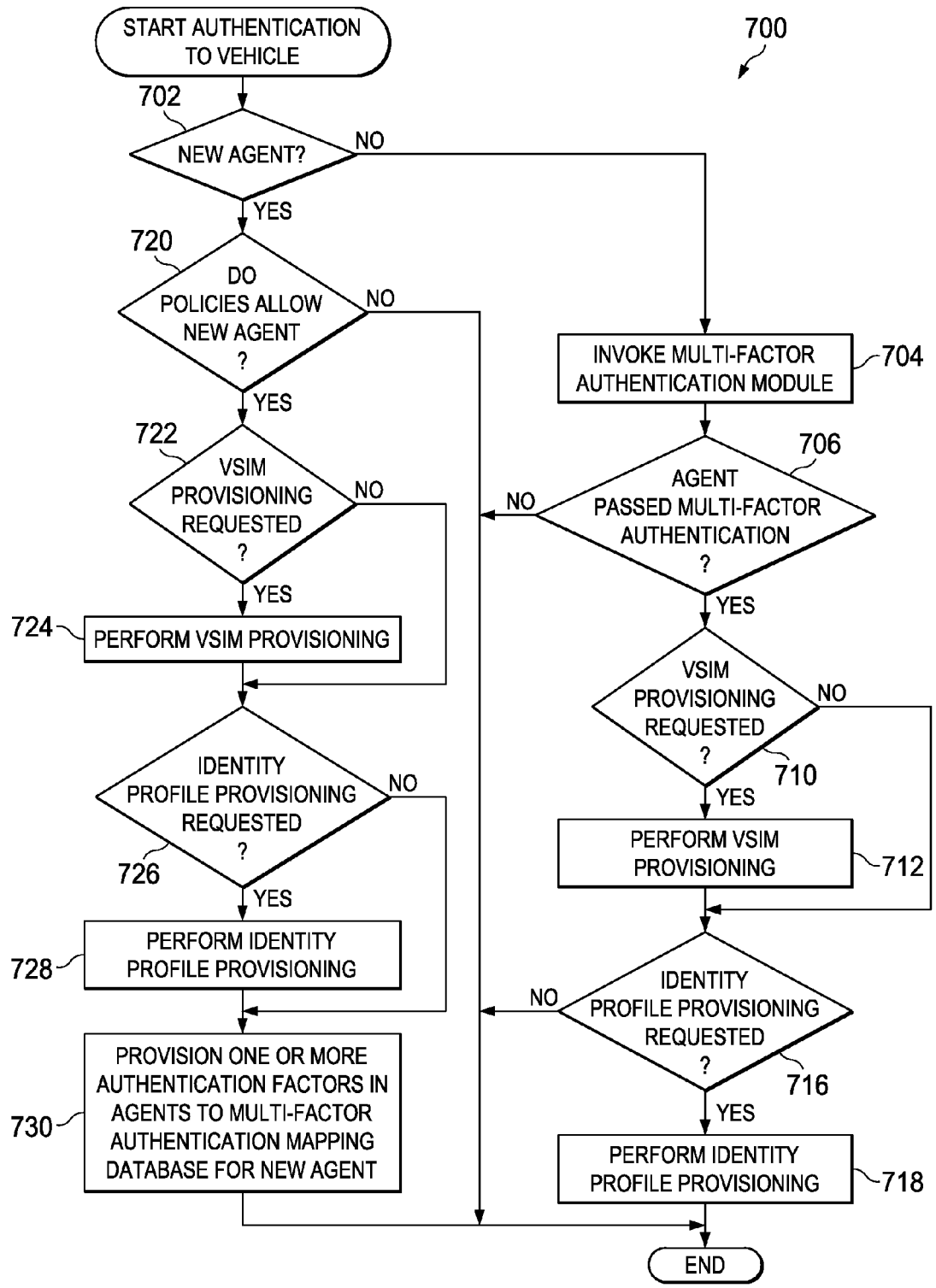

FIG. 7 is a simplified authentication to vehicle flow 700, which may be performed at step 604 of FIG. 6 and which illustrates example steps for authenticating an agent to the vehicle. Authentication to vehicle flow 700 begins at step 702 where a determination is made as to whether the detected agent is a new agent. "New agent" refers to an agent that does not have any authentication credentials, profile information, or VSIMs currently provisioned in OBU 30. New human agents could include, for example, a new owner, rental or lease driver, borrower, or passenger who has not previously been provisioned on the vehicle. Other types of new agents include, for example, a new mobile device attempting to access a local network of OBU 30, a new machine device (e.g., sensor, actuator, etc.) added to the vehicle, or a new software agent installed on OBU (e.g., a new dealership adds a software agent to automatically initiate connection with the dealership).

In one embodiment, agent identity of a human can be inferred from a key fob used by the human agent to enter the vehicle. In certain embodiments, when a driver enters a vehicle, display 28 can prompt the driver to confirm that his identity matches the displayed owner identity (or provisioned default driver) of the vehicle. If other identities of human agents have been provisioned in the vehicle, then the display could also provide a list of provisioned identities from which the agent can choose to authenticate. Display 28 could also provide the option to select "New Driver", "New Passenger", or the like.

If the agent is determined to be a new agent in decision box 702, then flow may pass to decision box 720 where a query is made as to whether policies allow a new agent to be provisioned. In some embodiments, OBU 30 may include a policy module that allows various policy controls, including new agent provisioning. Thus, for example, for an added layer of security, an owner may set policies that by default block any new agents from being added to OBU 30. Thus, whenever a new agent needs to be added, the owner would have to reset or override the policy with credentials to allow the new agent to be provisioned. Such policy settings can be controlled through a policy settings interface by an appropriate agent (e.g., the owner or other superagent with a specified high level of authority for conducting transactions and configuring policies in OBU 30). If the policies do not allow new agents as determined in decision box 720, then authentication to vehicle flow 700 ends and flow returns to agent provisioning flow 600 with the agent not authenticated.

If policies allow new agents to be provisioned as determined in decision box 720, however, then flow passes to decision box 722 where a determination is made as to whether VSIM provisioning is requested. In the case of a human agent, a display screen may offer the choice to the agent to provision a VSIM. If VSIM provisioning is requested, then flow passes to step 724 to perform VSIM provisioning, which will be further described with reference to FIGS. 9A and 9B. VSIM provisioning allows an agent to create or update one or more VSIMs with an identity service provider (e.g., third party identity service provider accessible through the Internet), and/or to download one or more VSIMs (e.g., from the identity service provider, from a transportable storage medium, from a mobile device) to OBU 30.

After the one or more VSIMs are provisioned in step 724, or if VSIM provisioning was not requested, flow passes to decision box 726 to determine whether identity profile provisioning is requested. In the case of a human agent, a display screen may offer the choice to the agent to provision an identity profile. If identity profile provisioning is requested, then flow passes to step 728 to perform identity profile provisioning, which will be further described herein with reference to FIGS. 10A and 10B. Identity profile provisioning allows an agent to create or update an identity profile through an identity service provider (e.g., third party identity service provider accessible through the Internet) or directly onto OBU 30. If an identity profile is created or updated through an identity service provider, or if an identity profile is stored on transportable storage medium or mobile device, then the identity profile can be downloaded to OBU 30.

After the identity profile is provisioned in step 728, or if identity profile provisioning was not requested, flow passes to step 730, where one or more authentication factors or requirements may be provisioned for the new agent in agents-to-multi-factor-authentication mapping database 83. Such factors could include user ID and password, biometrics, key fob, access card, etc., and one or more of these factors could be obtained by accessing the agent's identity profile credentials. For example, if an identity was provisioned and includes a user ID and password, the agent could be prompted to confirm that the user ID and password from the identity profile should be included as one of the authentication factors. After the authentication factors are provisioned in step 730, flow returns to agent provisioning flow 600 of FIG. 6.

Referring again to decision box 702, if the detected agent is determined to be an existing agent (e.g., with authentication credentials, VSIMs, identity profile), then flow passes to step 704 to perform multi-factor authentication, which will be described in more detail herein with reference to FIG. 8. Multi-factor authentication requires the detected agent to authenticate himself using one or more factors provided in agents-to-multi-factor-authentication mapping database 83. After the multi-factor authentication is performed, flow passes to decision box 706 to determine whether the detected agent passed the required multi-factor authentication. If the agent did not pass, then authentication to vehicle flow 700 flow ends and returns to agent provisioning flow 600 without the detected agent being authenticated.

If in decision box 706, it is determined that the detected agent passed the multi-factor authentication, however, then flow passes to steps 710 through 718. These steps essentially perform the same function as steps 722 through 728 with regard to VSIM and identity profile provisioning. Thus, the existing, authenticated agent is allowed to provision (by creating or updating) one or more VSIMs and/or an identity profile and to download such data to OBU 30.

Figure 8:
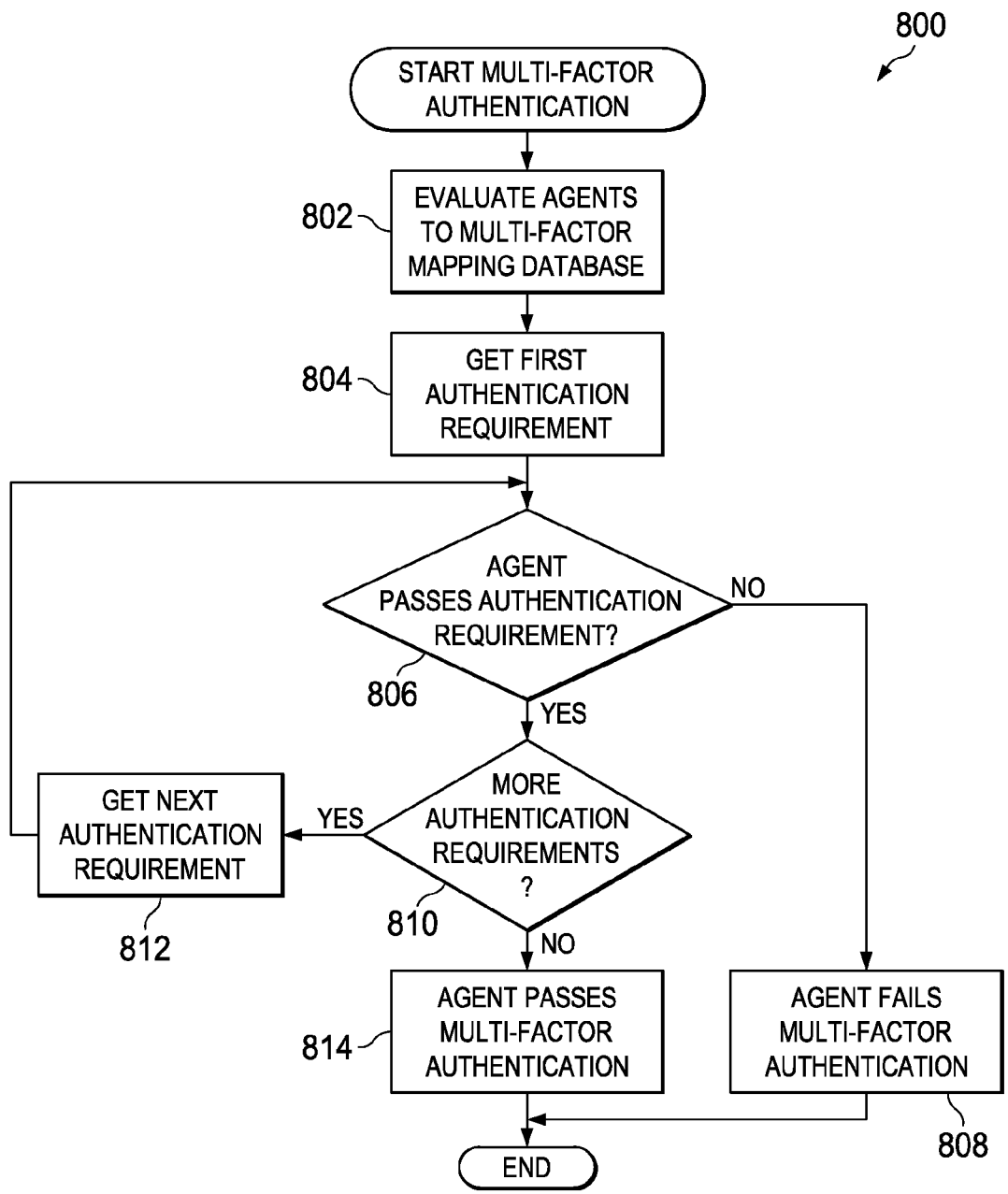

Turning to FIG. 8, a multi-factor authentication flow 800 is shown, which may be invoked in step 704 of FIG. 7, to authenticate the agent to access OBU 30. Multi-factor authentication flow 800 may also be used to authenticate the agent when the agent is attempting to conduct particular transactions through OBU 30, which will be further described herein with reference to FIG. 13. Flow begins at step 802 where agents-to-multi-factor-authentication mapping database 83 is evaluated. In one embodiment, the agent can be mapped to one or more authentication requirements necessary for authenticating to OBU 30. Moreover, each agent provisioned in OBU 30 could have various required authentication requirements and various numbers of such requirements. For example, an owner having significant privileges and access to OBU 30 and its resources may have several authentication requirements, whereas a passenger in the vehicle with limited access to OBU 30 and its resources may only need to provide a user ID and password. Flow moves to step 804 to get a first authentication requirement from mapping database 83. In one embodiment, a key fob used to open a door for a human agent could be the first authentication requirement for a driver or owner of the vehicle.

Flow then passes to decision box 806 where a determination is made as to whether the agent passes the authentication requirement (e.g., entering a correct user ID and password, providing a matching fingerprint, providing a valid PKI certificate, etc.). If the agent passes the authentication requirement, then flow moves to decision box 810 where a determination is made as to whether more authentication requirements are identified in agents-to-multi-factor-authentication mapping database 83. If additional requirements are necessary to authenticate the agent, flow passes to step 812 to identify the next requirement, and then passes back to decision box 806 to repeat the steps determining whether the agent passes the authentication requirement. This processing continues until the agent has passed all of the authentication requirements or until the agent fails one of the authentication requirements. If the agent passes all of the authentication requirements, then the agent is authenticated to the vehicle, as indicated in step 814, and multi-factor authentication flow 800 ends. If, however, the agent fails one of the authentication requirements, then the agent is not authenticated to the vehicle, as indicated in step 808, and the multi-factor authentication flow 800 ends.

Figure 9A:
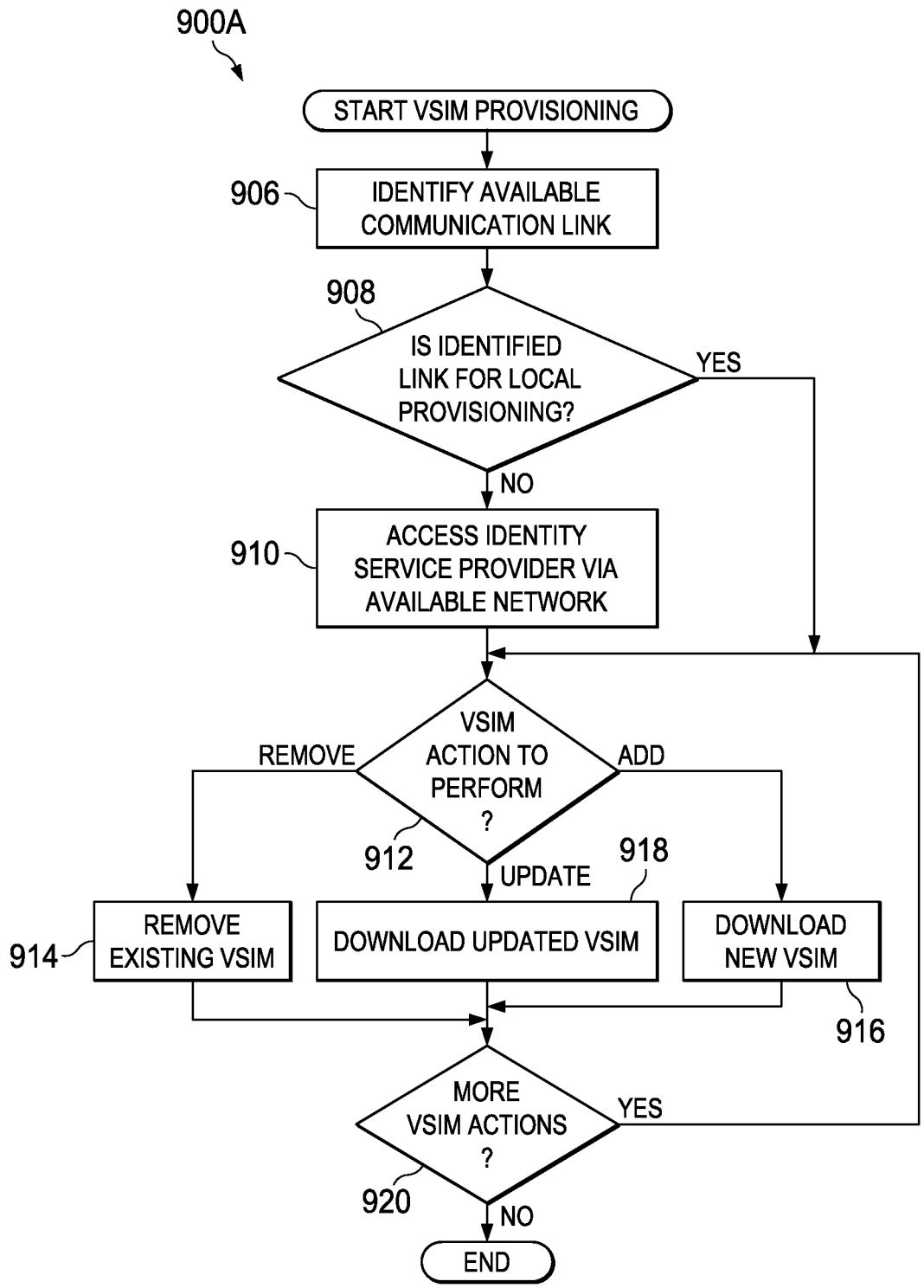
Figure 9B:
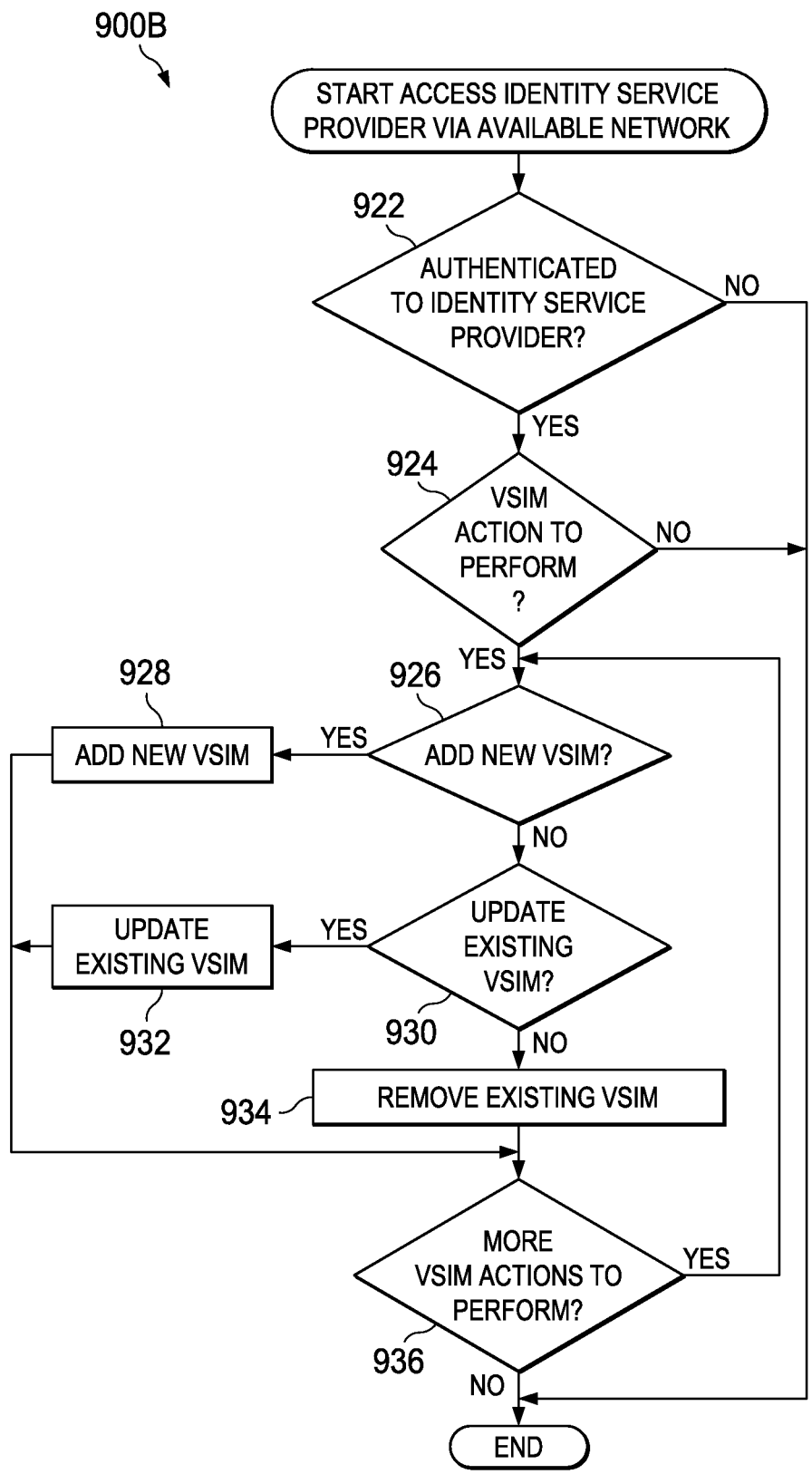

Turning to FIGS. 9A and 9B, simplified flowcharts of a VSIM provisioning flow 900A and an identity service provider access flow 900B, respectively, are illustrated. VSIM provisioning flow 900A may represent at least a portion of the flow of VSIM provisioning module 73 of OBU 30. In one embodiment, flow 900A can be invoked during authentication to vehicle flow 700 and also at any time during which an agent is authenticated to OBU 30.

Flow begins at step 906 where an available communication link is identified. Various communication links may be used to provision a VSIM, including some form of wireless communication (e.g., WiFi, WiMax, 3G, 4G, white space, 802.11x, satellite, etc.) to connect to identity service provider 60, a local network within vehicle 4 (e.g., local WiFi, Bluetooth, Ethernet, etc.) to connect to a mobile device, or a direct connection to a transportable medium (e.g., USB, CD, etc.). Flow passes to decision box 908 to determine whether the identified link is for local provisioning. If the identified communication link is not for local provisioning, then flow passes to step 910 to access identity service provider 60 via an available network. Example processing of identity service provider 60 will be described in more detail herein with reference to FIG. 9B.

When a network connection has been established to identity service provider 60 in step 910, or if the available communication link was identified for local provisioning, flow passes to decision box 912. In decision box 912 a determination is made with regard to what VSIM action to perform. If a VSIM is to be removed from OBU 30, then flow passes to step 914 to remove the VSIM. If a VSIM on OBU 30 is to be updated, then flow passes to step 918 to download a VSIM using the identified communication link (e.g., from identity service provider 60, from a transportable storage medium directly connected to OBU 30, from a mobile device) to update an existing VSIM. Finally, if a new VSIM is to be added to OBU 30, flow passes to step 916 to download the new VSIM using the identified communication link (e.g., from identity service provider 60, from a transportable storage medium directly connected to OBU 30, from a mobile device). Once the desired action (i.e., remove, update, or add) has been performed, flow passes to decision box 920 to determine whether more VSIM actions are to be performed. If more VSIM actions are to be performed, then flow passes back to decision box 912 to repeat the determination of whether to remove, update, or add a VSIM and to perform the desired action accordingly. This processing may continue until all VSIM actions have been completed. In one embodiment, an agent may be associated with multiple VSIMs provisioned in OBU 30. Therefore, multiple VSIM actions may occur during a single VSIM provisioning process.

Turning to FIG. 9B, a simplified flowchart illustrates possible processing steps of identity service provider 60 providing identity services for managing VSIMs, including accessing and downloading VSIMs to connected vehicles. As previously described herein, VSIMs may be managed and stored by identity service provider 60 in a memory element such as VSIM database 64. Flow 900B will be described with reference to a user, which includes a human provisioning the VSIM for any type of agent (e.g., software agent, machine device, authorized entity, human agent), including provisioning the VSIM for himself as a human agent. Flow could start at decision box 922, where a determination is made as to whether the user accessing identity service provider 60 has been authenticated to the identity service provider. For example, the user may log on to an account created with identity service provider 60. If the user is not authenticated, then flow ends. Although not shown in FIG. 9B, the user could potentially create a new account with identity service provider 60.

If the user is authenticated to identity service provider 60, then flow passes to decision box 924 to determine whether there is a VSIM action to perform. If, for example, a VSIM was previously created by the user (e.g., a user on a computer or mobile device creating a VSIM through identity service provider 60), then the user may simply need to access and download the existing VSIM to OBU 30. However, if the user needs to create, update, and/or remove a VSIM, then flow passes to decision box 926 to determine whether to add a new VSIM to OBU 30. If a request is made to add a new VSIM (e.g., to VSIM database 64), then flow passes to step 928 to add the new VSIM. If adding a new VSIM is not requested, as determined in decision box 926, then flow passes to decision box 930 to determine whether a request was made to update an existing VSIM. If an update request was made, then flow passes to step 932 where an existing VSIM is updated. If an update request is not made, as determined in decision box 930, however, then flow passes to step 934 where an identified VSIM is removed.

After a VSIM is either added (step 928), updated (step 932), or removed (step 934), flow passes to decision box 936 where it is determined whether there are more VSIM actions to perform. If more VSIM actions are requested, then flow passes back to decision box 926 and steps 926 through 936 continue to be processed until no more VSIM actions are requested. Once no more VSIM actions are requested, or after it is determined that there are no VSIM actions to perform, then the connection to identity service provider 60 from OBU 30 may continue until one or more VSIMs are downloaded to OBU 30. In addition, it will be apparent that flow 900B may also occur when a user establishes a network connection to identity service provider 60 from a remote computer or mobile device to manage his associated VSIMs.

Figure 10A:
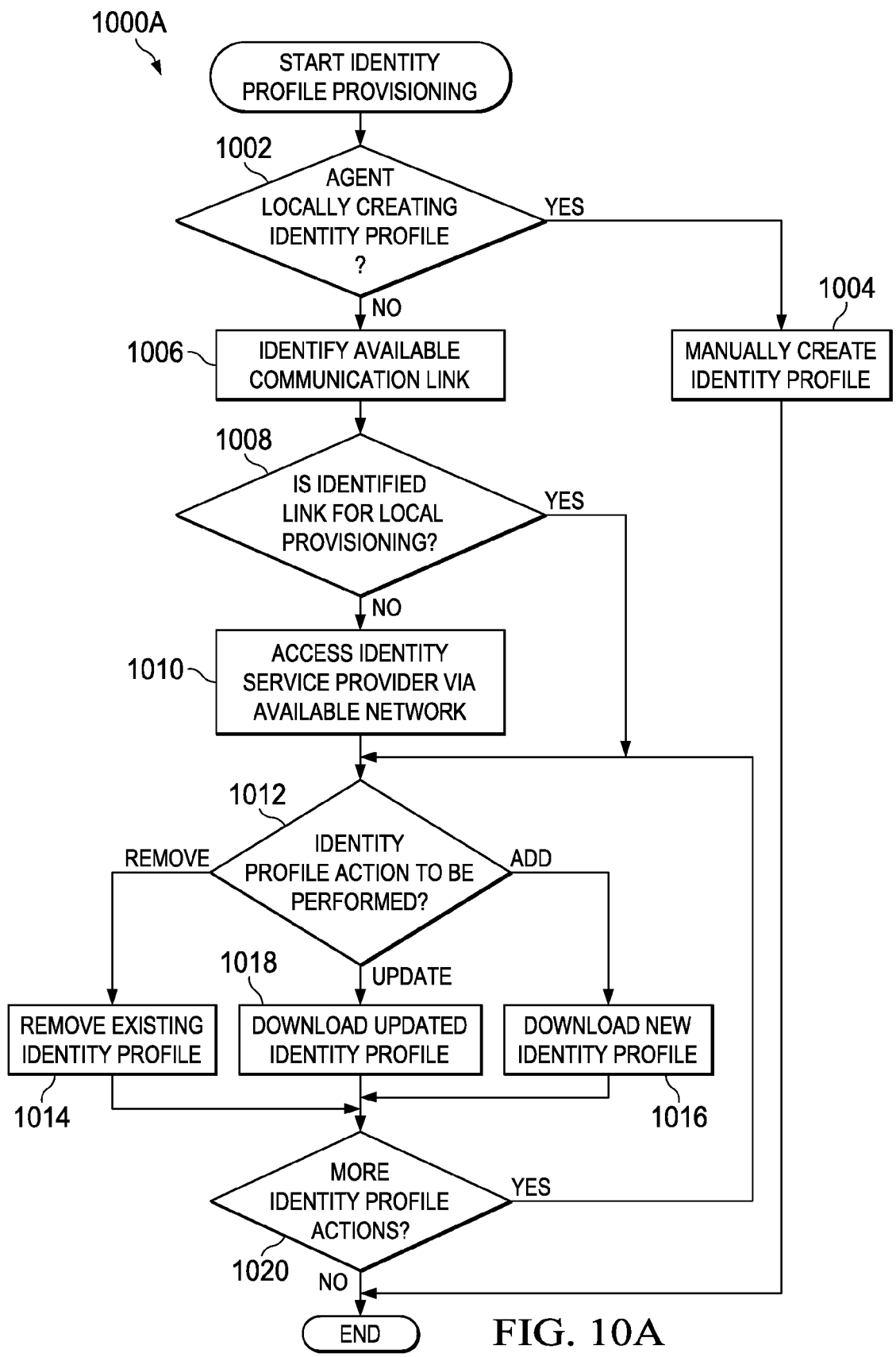
Figure 10B:
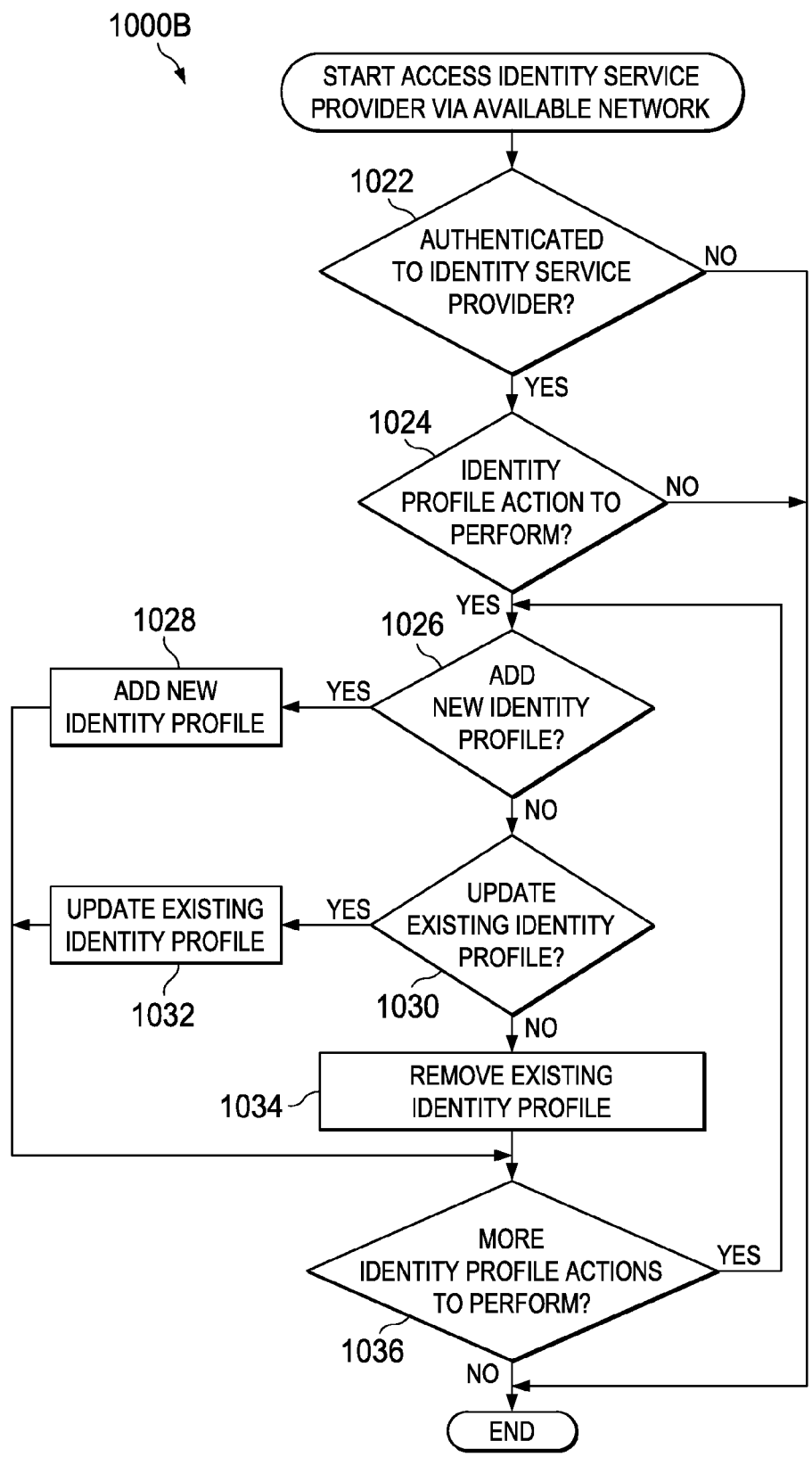

Turning to FIGS. 10A and 10B simplified flowcharts of an identity profile provisioning flow 1000A and another identity service provider access flow 1000B, respectively, are illustrated. Identity profile provisioning flow 1000A may represent at least a portion of the flow of identity profile provisioning module 75 of OBU 30. In one embodiment, flow 1000A can be invoked during authentication to vehicle flow 700 and also at any time during which an agent is authenticated to OBU 30.

Flow begins at decision box 1002 where a determination is made as to whether an agent is locally creating an identity profile. In one embodiment, an agent can manually create an identity profile on OBU 30 by entering profile information directly into OBU 30 through an appropriate user interface. If the agent is locally creating an identity profile, then flow passes to step 1004 where the agent is permitted to manually create an identity profile, and then flow ends.

If it is determined that the agent is not locally creating an identity profile, then flow passes to step 1006 where an available communication link is identified. Various communication links may be used to provision a identity profile, including some form of wireless communication (e.g., WiFi, WiMax, 3G, 4G, white space, 802.11x, satellite, etc.) to connect to identity service provider 60, a local network within vehicle 4 (e.g., local WiFi, Bluetooth, Ethernet, etc.) to connect to a mobile device, or a direct connection to a transportable medium (e.g., USB, CD, etc.). If the identified communication link is not for local provisioning, then flow passes to step 1010 to access identity service provider 60 via an available network. Example processing of identity service provider 60 will be described herein in more detail with reference to FIG. 10B.

When a network connection has been established to identity service provider 60 in step 1010, or if the available communication link was identified for local provisioning, flow passes to decision box 1012. In decision box 1012 a determination is made with regard to what identity profile action to perform. If an identity profile is to be removed from OBU 30, then flow passes to step 1014 to remove the identity profile. If a identity profile on OBU 30 is to be updated, then flow passes to step 1018 to download a identity profile using the identified communication link (e.g., from identity service provider 60, from a transportable storage medium directly connected to OBU 30, or from a mobile device) to update an existing identity profile. Finally, if a new identity profile is to be added to OBU 30, flow passes to step 1016 to download the new identity profile using the identified communication link (e.g., from identity service provider 60, from a transportable storage medium directly connected to OBU 30, or from a mobile device). Once the desired action (i.e., remove, update, or add) has been performed, flow passes to decision box 1020 to determine whether more identity profile actions are to be performed. If more identity profile actions are to be performed, then flow passes back to decision box 1012 to repeat the determination of whether to remove, update, or add a identity profile and to perform the desired action accordingly. This processing may continue until all identity profile actions have been completed.

Turning to FIG. 10B, a simplified flowchart illustrates possible processing steps of identity service provider 60 providing identity services for managing identity profiles, including accessing and downloading identity profiles to connected vehicles. As previously described herein, identity profiles may be managed and stored by identity service provider 60 in a memory element such as identity profile memory element 62. Flow 1000B will be described with reference to a user, which includes a human provisioning the identity profile for any type of agent (e.g., software agent, machine device, authorized entity, human agent), including provisioning the identity profile for himself as a human agent. Flow could start at decision box 1022, where a determination is made as to whether the agent accessing identity service provider 60 has been authenticated to the identity service provider. For example, the user may log on to an account created with identity service provider 60. If the user is not authenticated, then flow ends. Although not shown in FIG. 10B, the user could potentially create a new account with identity service provider 60.

If the user is authenticated to identity service provider 60, then flow passes to decision box 1024 to determine whether there is an identity profile action to perform. If, for example, an identity profile was previously created by the user (e.g., a user on a computer or mobile device creating an identity profile through identity service provider 60), then the user may simply need to access and download the existing identity profile to OBU 30. However, if the user needs to create, update, and/or remove an identity profile, then flow passes to decision box 1026 to determine whether to add a new identity profile to OBU 30. If a request is made to add a new identity profile (e.g., to identity profile database 64), then flow passes to step 1028 to add the new identity profile. If adding a new identity profile is not requested, as determined in decision box 1026, then flow passes to decision box 1030 to determine whether a request was made to update an existing identity profile. If an update request was made, then flow passes to step 1032 where an existing identity profile is updated. If an update request is not made, as determined in decision box 1030, however, then flow passes to step 1034 where an identified identity profile is removed.

After an identity profile is either added (step 1028), updated (step 1032), or removed (step 1034), flow passes to decision box 1036 where it is determined whether there are more identity profile actions to perform. If more identity profile actions are requested, then flow passes back to decision box 1026 and steps 1026 through 1036 continue to be processed until no more identity profile actions are requested. Once no more identity profile actions are requested, or after it is determined that there are no identity profile actions to perform, then the connection to identity service provider 60 from OBU 30 may continue until one or more identity profiles are downloaded to OBU 30. In addition, it will be apparent that flow 1000B may also occur when a user establishes a network connection to identity service provider 60 from a remote computer or mobile device to manage his identity profiles.

Figure 11:
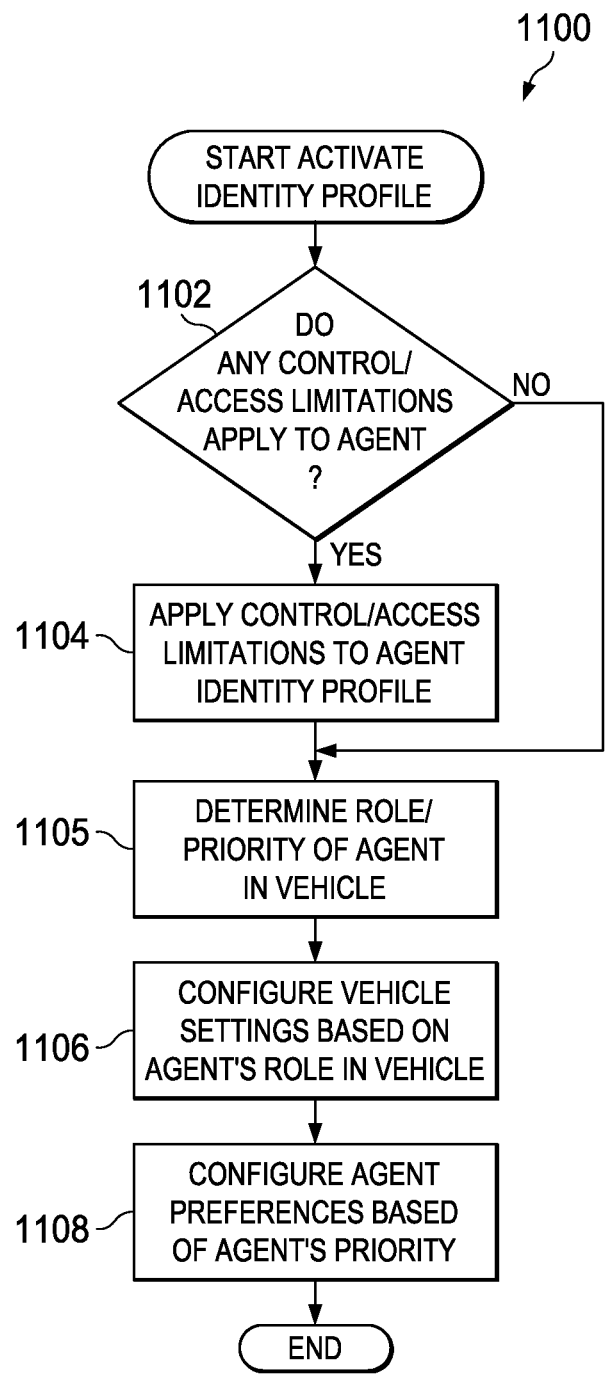

FIG. 11 illustrates a simplified flowchart of example steps for activating an identity profile, as indicated in step 610 of FIG. 6, after the identity profile has been provisioned in OBU 30 and an associated agent has been authenticated to OBU 30. For example, flow may begin in decision box 1102 where a determination is made regarding whether any control/access limitations have been set by one agent that apply to another agent. Typically, an owner of the vehicle or other superagent will have authority to set such controls/access limitations by configuring policies through an appropriate policy module. Such controls/access limitations may include, for example, parental controls set by a parent of a child (e.g., restrictions on certain web content, media features, any transactions involving credit cards or payments, vehicle functions, etc.). If control/access limitations exist, then flow passes to step 1104 to apply such control/access limitations to the identity profile of the agent.

After the limitations are applied, or if no limitations exist for the agent, then flow may pass to step 1105 to determine the role and priority of the agent in the vehicle. For human agents, role can be determined based on which seat of the vehicle the agent occupies (e.g., driver seat, front passenger seat, rear left passenger seat, rear right passenger seat, etc.). Once the role and priority of the agent are determined, flow passes to step 1106 to configure the vehicle settings based on the agent's role in the vehicle. Depending on the role of the agent, OBU 30 may communicate the agent's identity profile parameters corresponding to actuators and software applications of the particular seat occupied by the agent. For example, seat positioning, air temperature settings, seat heater/cooler, dashboard features, and the like may be configured for the agent if the agent is the driver. If the agent is a passenger, however, the seat positioning, seat heater/cooler, and temperature settings may be applied to the agent's particular passenger seat, if such settings are available for the passenger seat.

Once the vehicle settings are applied in step 1106, flow may pass to step 1108 to configure other identity profile parameters based on an agent's priority. Depending on the agent's priority, OBU may communicate the agent's identity profile parameters corresponding to any appropriate actuators, software applications, and the like related to agent preferences (e.g., radio channel list, phonebook, address book, GPS favorite locations, etc.). For purposes of illustration, it is assumed that a driver has highest priority and driver preferences will override any conflicting passenger preferences. It should be understood, however, that a passenger could be configured with a higher priority and override the driver's preferences for preferences not pertaining to the safety of the vehicle. Additionally, OBU 30 may also configure network interface accounts and network configurations for other mobile devices identified in the agent's identity profile (e.g., in a device list). Moreover, while examples have been provided for human agents, activating an identity profile of other types of agents authenticated to the OBU may also occur for any appropriate identity profile parameters in an authenticated agent's identity profile.

Figure 12:
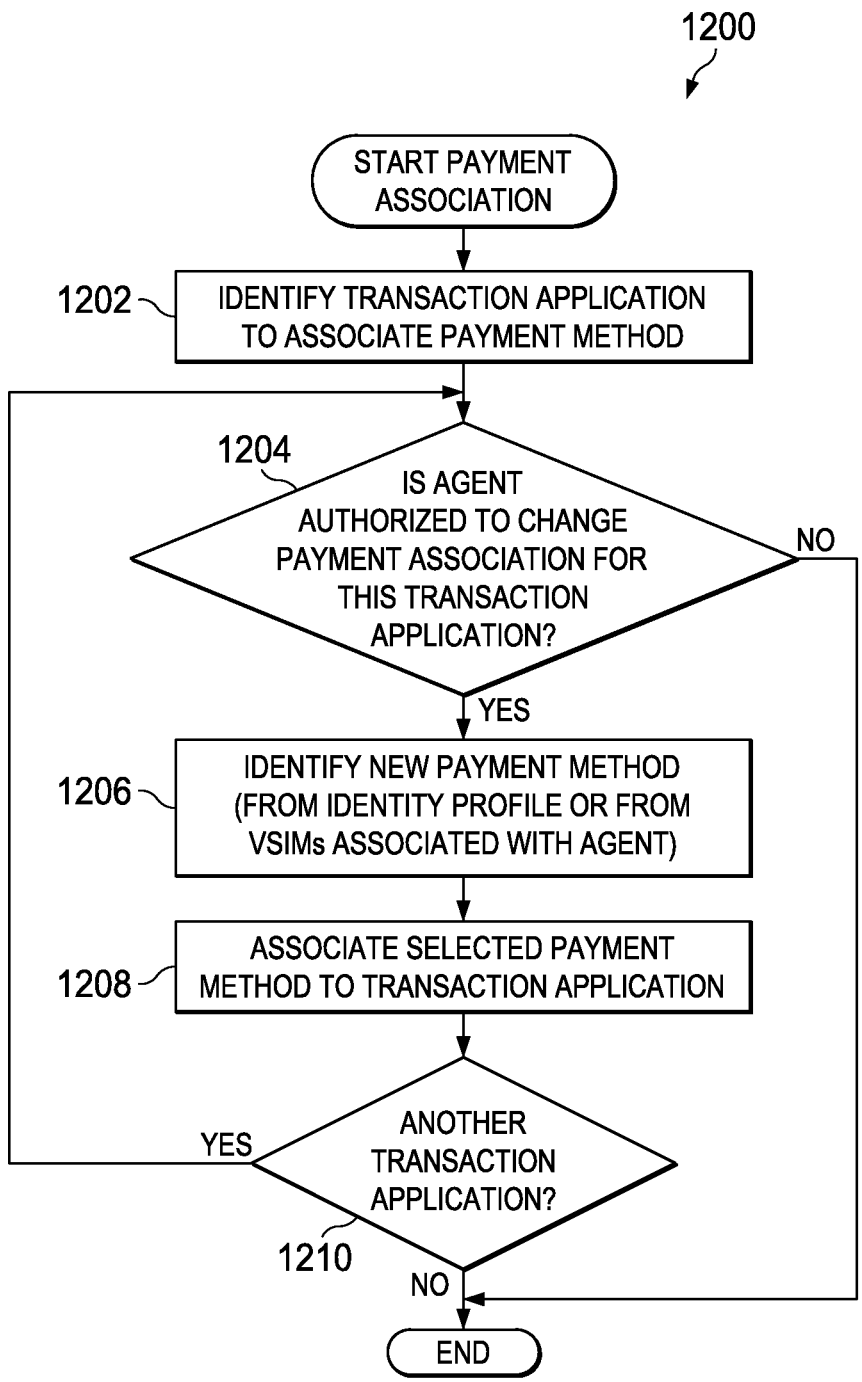

FIG. 12 illustrates a simplified flowchart of example steps of payment association module 79, for associating a payment method to certain transaction applications that are not associated with or initiated by an agent that has an associated payment method (e.g., payment information in identity profile, VSIM). For example, if a toll payment transaction application is configured to pay tolls automatically, then a payment method needs to be associated with the toll payment transaction application. The payment method could be payment information such as a credit card or bank account from an agent's identity profile, or a VSIM to be used as payment on a back end of the corresponding mobile network operator. In addition, over the life of the vehicle, changes to the payment methods associated with such transaction applications may be desired (e.g., each driver of a vehicle owned by a rental car agency may be required to pay their own tolls, a new owner will need to associate a new payment method with such vehicle transaction applications, an owner of a vehicle may have a credit card or banking account change that needs to be updated, someone borrowing a car or sharing trip expenses may want to pay for all certain transactions through a payment method provided in their identity profile, etc.)

Generally, payment association flow 1200 of FIG. 12 represents both automatic and manual payment association to transaction applications. Flow 1200 may be invoked when an agent is being provisioned, as indicated in step 614 of FIG. 6, or at any time during which an agent is authenticated to the vehicle. In the scenario in which the agent is being provisioned, flow 1200 may occur automatically and, depending on the role and priority of the agent, may automatically associate the agent's payment methods to the identified one or more transactions. In another scenario in which the agent has already been provisioned and authenticated to the vehicle, then flow 1200 may be invoked by the agent through an appropriate user interface of OBU 30 in which the agent may individually or collectively identify which transaction applications to associate with which payment methods.

Flow begins in step 1202 where a transaction application is identified. The identified transaction application may be an application that is not associated with or initiated by an agent that has an associated payment method. Flow then passes to decision box 1204 where a determination is made as to whether the agent attempting to make the payment association is authorized to change payment association for the identified transaction application (e.g., if the agent is being provisioned but is not the driver then the agent may not be authorized, if policies do not allow the agent to change payment associations then the agent will not be authorized, etc.). If the agent is not authorized as determined in decision box 1204, then flow 1200 ends and payment associations are not made.

If is determined in decision box 1204 that the agent is authorized to change payment association for the identified transaction application, then flow passes to step 1206. In step 1206 a new payment method is identified from the agent's identity profile payment information or from the agent's corresponding VSIM. The agent's identity profile payment information may include information for a credit card, a debit card, a bank account, or other payment service providers. Alternatively, a VSIM associated with the agent could be used to provide payment. The VSIM could be used to connect to the associated mobile network operator, the payment could be received from the mobile network operator, and then the mobile network operator could bill the agent on the back end (e.g., with a set periodic or stand-alone bill to the agent). In a manual process of payment association, the agent can simply be provided with suitable options to select a desired payment method from options associated with the agent. In the automatic payment association, however, priority of available payment options can be pre-specified in any suitable way (e.g., an indication provided in the identity profile, etc.).

Once the payment method is determined in step 1206, flow passes to step 1208 to associate the selected payment method to the identified transaction application. In one embodiment, a separate mapping database may be provided to map identified transaction applications to selected payment methods. In another embodiment, an existing mapping database, such as transaction-to-agents mapping database 82, may be used and may include any suitable mechanism (e.g., pointer, link list, additional field, etc.) to indicate which agent to select to retrieve an associated payment method for the transaction application.

After the selected payment method is associated to the identified transaction application, flow passes to decision box 1210 to determine whether another transaction application has been identified. If another transaction application has been identified (e.g., parking transaction application), then flow passes back to decision box 1204 to process the newly identified transaction application. Steps 1204 through 1210 can be repeated until no more transaction applications are identified, and flow ends.

Figure 13:
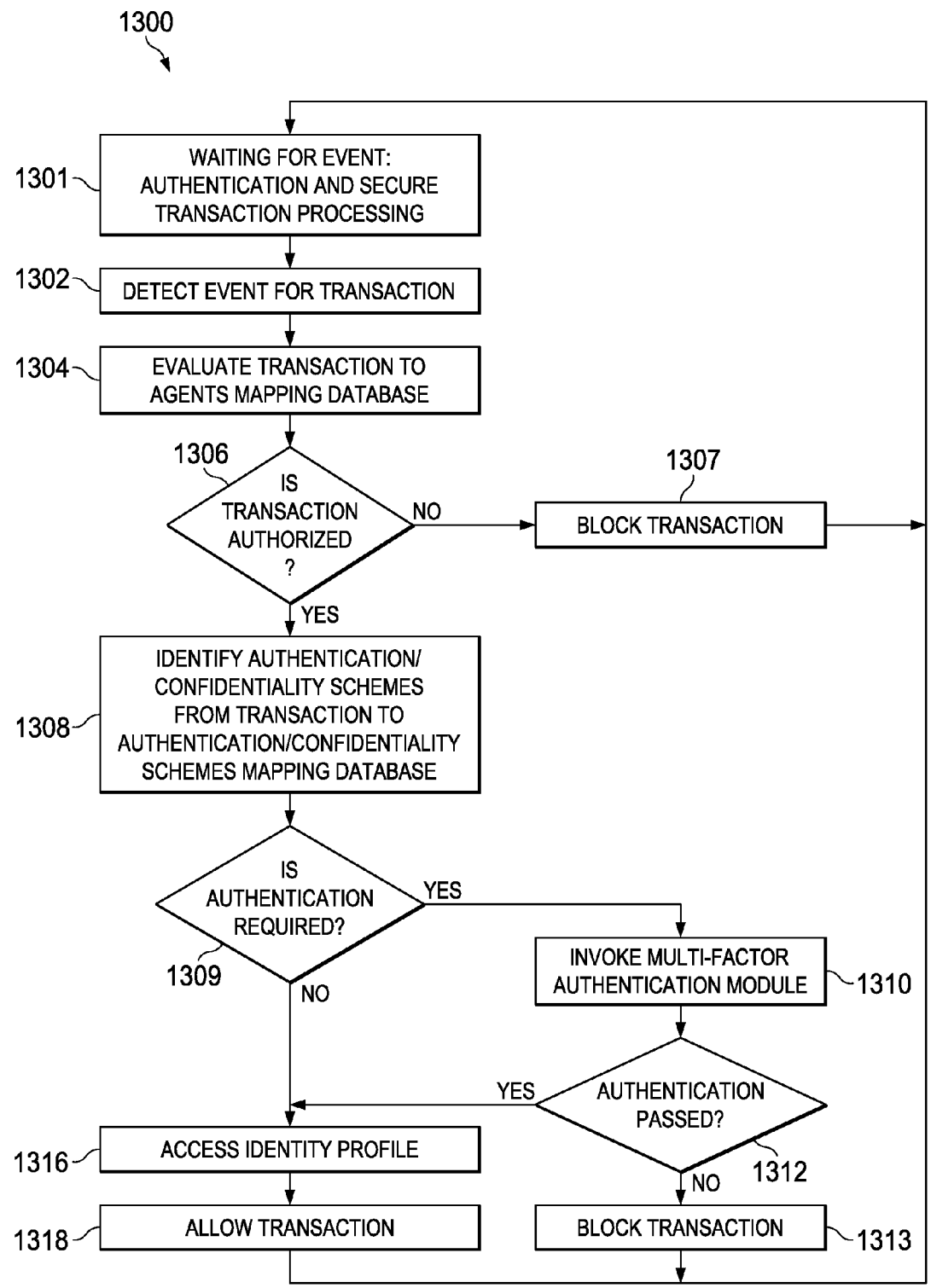
Figure 14:
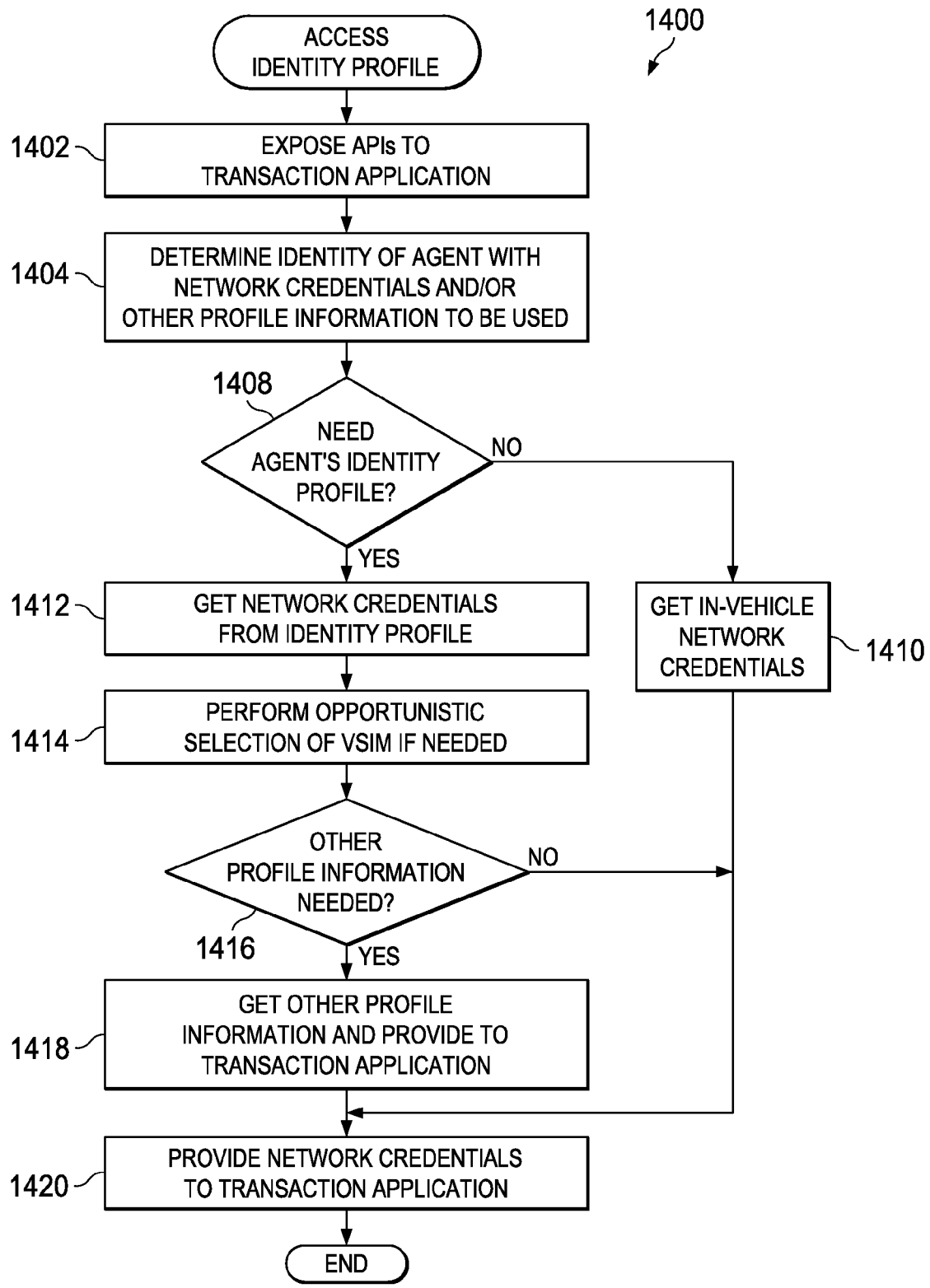

Turning to FIGS. 13 and 14, simplified flowcharts with an authentication and secure transaction flow 1300 and an identity profile access flow 1400 are illustrated. Authentication and secure transaction flow 1300 may be configured as a background process open and running whenever OBU 30 is booted up. Flow starts at step 1301 where the process waits for an event for a transaction, which could have a trigger associated with an agent to initiate the transaction. Triggers could include, for example, a human agent attempting to initiate a transaction (e.g., by pressing a button or otherwise issuing commands through any suitable user interface on display 28, by using a mobile device to access OBU 30), a machine device receiving or transmitting a signal (e.g., a detector receiving a signal from a toll system, a detector receiving a signal from a parking system, a sensor in the vehicle sending a signal to OBU 30, etc.), a software agent attempting to execute (e.g., requesting network credentials to automatically connect to an authorized entity, etc.), or an authorized entity attempting to access OBU 30 (e.g., authorized entity connected to the vehicle and attempting to access transaction applications on the vehicle, etc.).

When an event occurs, the event is detected in step 1302 and then flow moves to step 1304 to evaluate transaction-to-agents mapping database 82. In decision box 1306, a determination is made as to whether the transaction is authorized. If the mapping database 82 does not indicate the transaction is authorized (e.g., the agent is not mapped to a transaction application corresponding to the transaction), then flow passes to 1307 where the transaction is blocked. Flow then passes back to step 1301 to wait for another event.

If transaction-to-agents mapping database 82 indicates the transaction is authorized (e.g., the agent is mapped to a transaction application corresponding to the transaction), as determined in decision box 1306, then flow may pass to step 1308 to identify authentication and confidentiality schemes by evaluating transaction-to-authentication/confidentiality-schemes mapping database 84. Mapping database 84 may include which transactions require authentication of the associated agent. Although the agent should already be provisioned and authenticated to the vehicle when transaction processing occurs, some transactions may be of a sensitive nature, and authentication must be provided again. In addition, in one embodiment, initial authentication to the vehicle may be provided with a single authentication requirement, whereas authentication to conduct certain transactions may require multiple authentication requirements as indicated in agent-to-multi-factor-authentication mapping database 83 and transaction-to-authentication-and-confidentiality-schemes mapping database 84. For example, access to a banking transaction application that facilitates transactions to personal bank accounts of agents, may require re-authenticating the agent with multiple authentication requirements (e.g., biometrics in addition to a key fob used to initially authenticate to OBU 30). In addition, mapping database 84 may also indicate other authentication and confidentiality schemes to be used by a transaction application such as, for example, a particular encryption mechanism for data associated with the transaction application. Additionally, any authentication protocols required for establishing network connections may also be provided in mapping database 84.

After authentication and confidentiality schemes are identified in step 1308, flow passes to decision box 1309 to determine whether agent authentication is required for the transaction. In one embodiment, if authentication is required, then multifactor authentication module 74 may be invoked in step 1310, as previously discussed herein with reference to FIG. 8. If multi-factor authentication is required, the agent could be mapped to one or more of the same or different authentication requirements used during the initial authentication of the agent to OBU 30. Thus, multi-factor authentication flow 800 could be configured to distinguish between initial authentication of an agent to OBU 30 and authentication of an agent for particular transactions. If the agent does not pass authentication as determined in decision box 1312, then flow passes to step 1313 where the transaction is blocked. Flow then passes back to step 1301 to wait for another event.

If the agent passes authentication, as determined in decision box 1312, or if authentication of the agent was not required, as determined in decision box 1309, then flow passes to step 1316 in which the identity profile may be accessed to obtain network credentials and any other needed profile information such as payment information for commercial transactions. Accessing the identity profile will be described in more detail herein with reference to FIG. 14. After the network credentials and any needed profile information are provided to the transaction application in step 1316, flow passes to step 1318 to allow the transaction. Flow then returns to step 1301 to wait for another event. Although transactions can be processed by transaction processing flow 1300 sequentially, it will be apparent that transaction processing flow 1300 is intended to initiate each time an event is detected, which can occur simultaneously with other events. Thus, multiple transactions may be occurring on OBU 30 simultaneously.

Turning now to FIG. 14, FIG. 14 illustrates a simplified flowchart of an access identity profile flow 1400, which may occur in step 1316 of FIG. 13. Flow 1400 includes step 1402 where application programming interfaces (APIs) are exposed to a transaction application corresponding to the transaction to enable the transaction application to securely access relevant parts of the identity profile. APIs may be provided to export parts of the identity profile to the transaction application to the extent that the transaction application is authorized to access the profile information. (e.g., credit/payment information, social media web accounts, etc.)

Flow then moves to step 1404 to determine the identity of the agent to be used to provide network credentials and/or other profile information such as payment information. In a simple case, a human agent who initiates a commercial transaction by triggering an Internet commerce transaction application on OBU 30 may have an identity profile that can be used to obtain network credentials and payment information. In other transaction scenarios, however, the agent associated with the event may not have payment information and/or network credentials. Therefore, the determination in step 1404 accommodates certain transaction applications that need profile information from an agent other than the agent associated transaction. For example, a driver or other passenger may want to pay for toll transactions that occur automatically when a detector (agent) senses the toll system and initiates a toll transaction application. Therefore, the identity of the particular agent with the payment information needs to be determined. This can be accomplished in various ways including, for example, a display screen offering a human agent the option to pay the toll using identity profile information. Alternatively, a human agent could preconfigure the payment information through, for example, payment association module 79.

Once the determination is made in step 1404, flow passes to decision box 1408 to determine whether the identity profile of the agent is needed. In some transaction scenarios, network credentials for remote network access (e.g., VSIM, WiFi, etc.) may not be required for a transaction application. For example, a transaction application merely accessing in-vehicle networks and having no commercial component may not need any identity profile information. In this case, flow passes to step 1410 to get network credentials for in-vehicle networks, if the transaction application accesses an in-vehicle network. Flow then passes to step 1420 to provide the in-vehicle network credentials to the transaction application, if needed.

If the identity profile is needed for a transaction application requiring remote network access or a transaction application occurring internally (e.g., not requiring remote network access), as determined in decision box 1408, then flow passes to step 1412. In step 1412, network credentials are obtained from identity profile, if needed. Flow may then pass to step 1414 to perform opportunistic selection of VSIM, if needed, which will be further described herein with reference to FIG. 15. Opportunistic selection of VSIM may be needed if VSIM selection rules apply to the particular agent, the transaction application, and/or vehicle geographical location. Steps 1412 and 1414 may not be necessary if the transaction application does not need remote network access.

After the VSIM is selected, then flow passes to decision box 1416 to determine whether other profile information is needed from the agent's identity profile. Other information includes, for example, payment information, which could be necessary if the transaction application has a commercial component. If other profile information is needed, then flow passes to step 1418 to get the other profile information and provide such information to the transaction application. Finally, after the profile information is provided to the transaction application in step 1418, or if other profile information is not needed as determined in decision box 1416, flow passes to step 1420 to provide any obtained network credentials, including the VSIM, to the transaction application.

Figure 15:
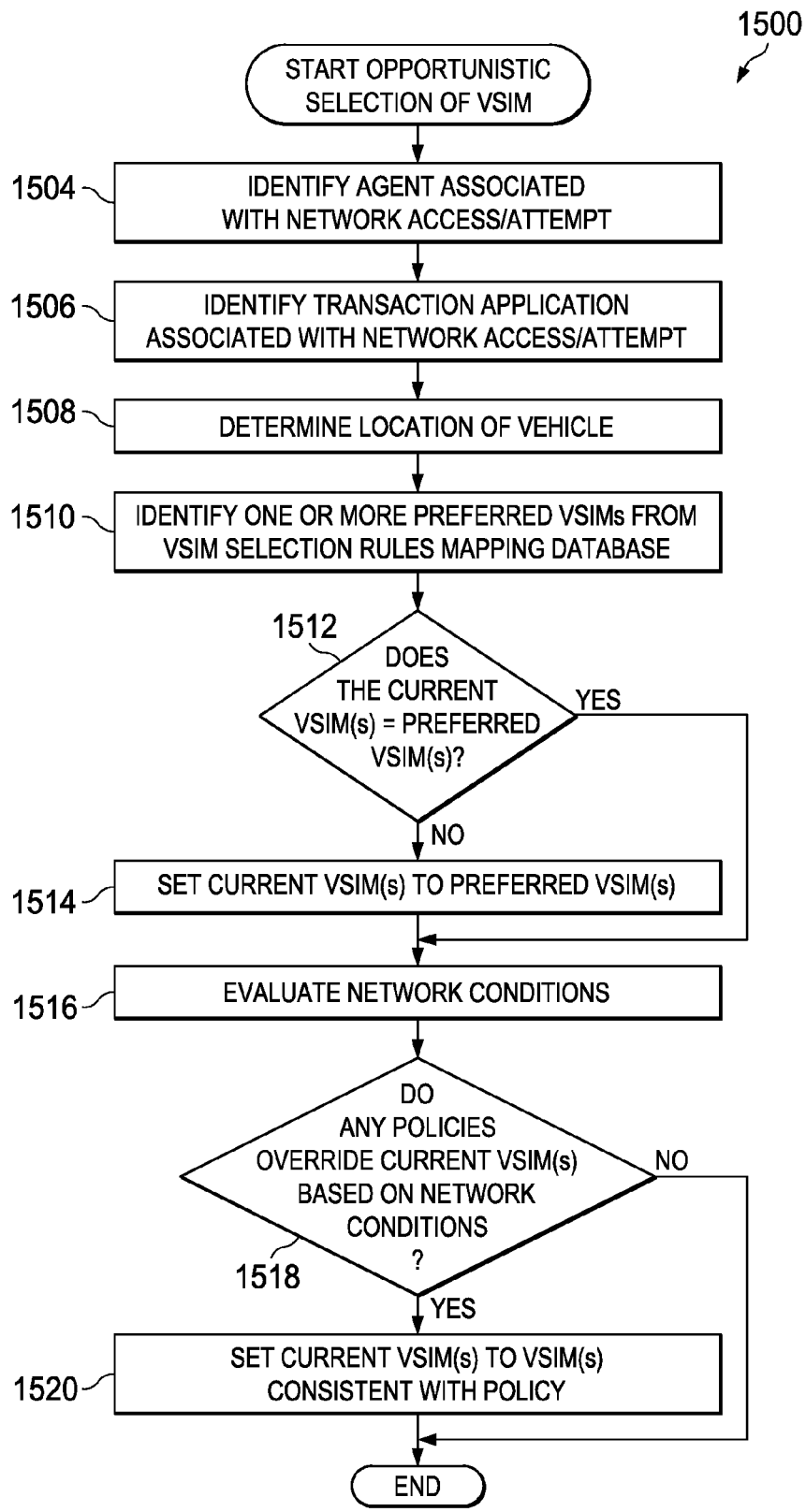

FIG. 15 is a simplified flowchart of an opportunistic VSIM selection flow 1500. Because a vehicle may at any given time use multiple VSIMs, the VSIMs may be opportunistically selected for better connectivity, for different traffic and application types, for different locations, and for a better user experience. In one embodiment, opportunistic VSIM selection flow 1500 dynamically evaluates VSIM selection rules database 85 to determine whether a particular VSIM selected for connectivity is the preferred VSIM for a particular set of criteria (e.g., agent identity, location of the vehicle, transaction application). If the set of criteria is mapped to a different VSIM than a currently selected VSIM, then the VSIM can be dynamically changed to accommodate the agent or vehicle owner's preferences. Opportunistic VSIM selection flow 1500 may occur when a transaction has been initiated and a corresponding transaction application is waiting for network credentials, or during an established network connection associated with a transaction application. Although FIG. 15 is described with reference to opportunistically selecting a VSIM, it will be appreciated that other wireless connection options (e.g., WiFi, etc.) may also be opportunistically selected and may be mapped to particular sets of criteria.

Flow may begin in steps 1504 through 1508 where the set of criteria are determined. In step 1504 an agent associated with the network access/attempt may be identified. In step 1506, a transaction application associated with the network access/attempt may be identified. Finally, in step 1508, a current location of the vehicle may determined (e.g., by navigation system 17). Flow then passes to step 1510 where one or more preferred VSIMs are identified from VSIM selection rules mapping database 85. In decision box 1512 a determination is made as to whether the current VSIM(s), which could include one or more VSIMs, are equivalent to the preferred VSIM(s) identified from VSIM selection rules mapping database 85. When opportunistic VSIM selection flow 1500 is processing to evaluate an established network connection associated with a transaction application, the current VSIM(s) could be one or more VSIMs currently being used for the established network connection. However, when opportunistic VSIM selection flow 1500 is processing during identity profile access flow 1400 at step 1414, then the current VSIM(s) could be one or more VSIMs selected from an identity profile for a transaction application waiting to receive network credentials. If the preferred VSIM(s) are different than the current VSIM(s), then flow passes to step 1514 where the current VSIM(s) are changed to the preferred VSIM(s). In the case of an established network connection, the network connection may be moved to network access links enabled by the preferred VSIM(s).

After the current VSIM(s) are changed to the preferred VSIM(s) in step 1514, or if the current VSIM(s) are equivalent to the preferred VSIM(s) as determined in decision box 1512, then flow passes to step 1516 to evaluate network conditions. In the next decision box 1518, a determination is made as to whether any policies override the current VSIM(s) because, in one embodiment, various network conditions and policies related to such network conditions may override a VSIM preference. For example, a VSIM preference based on a particular location, such as a preference for using mobile network operator X in New York because it is more cost effective than using mobile network operator Y, may be overridden if the network conditions of mobile network operator X are not suitable. Similarly, multiple VSIMs, or a VSIM associated with another agent may be selected, depending on network conditions and authorization to use the other agent's network credentials. Thus, if policies based on network conditions override the current VSIM(s), then flow passes to step 1520 where the current VSIM(s) are changed to one or more VSIMs consistent with the policy. After the current VSIM(s) are changed in step 1520, or if policies and network conditions did not require a change to the current VSIM(s) as determined in decision box 1518, flow ends, and the associated transaction application may establish a network connection using the current VSIM(s) or may continue network access with the current VSIM(s), as appropriate.

By using the infrastructure described above, a connected vehicle can opportunistically switch between multiple VSIM identities to allow for multiple identity profiles to be used during the vehicle's lifecycle. Thus, the infrastructure enables multiple agents to source communication from the vehicle. To illustrate these features, an example scenario will now be described of a possible lifecycle of a connected vehicle and identities associated with the connected vehicle.

In the beginning of the life of a vehicle (e.g., vehicle 4), a manufacturer of the vehicle may provision an OBU (e.g., OBU 30) configured within vehicle 4 with a physical UICC card that is initialized with an identity associated with the vehicle manufacturer, which can be used for authentication to download soft SIM or VSIM identities issued by mobile network operators. A software agent may also be provisioned in OBU 30 to connect to a desired an identity service provider 60 (e.g., third party identity service provider, mobile network operator, manufacturer identity service provider, etc.) to obtain the VSIM. For example, if vehicle 4 is manufactured in Japan, then software agent may use the manufacturer VSIM to authenticate vehicle 4 to the identity service provider, and then download a VSIM to be used during quality assurance testing before vehicle 4 is exported from Japan to an automotive dealer in the United States (U.S.).

After vehicle 4 is shipped and crosses an international border such as the U.S., the software agent can use manufacturer VSIM identity to download a VSIM of a local mobile network operator (e.g., Verizon, AT&T, T-Mobile, SPRINT, PCS, etc.), by accessing an identity service provider 60 through which the manufacturer has provisioned VSIMs. This may be desirable for the manufacturer to avoid expensive roaming charges. Thus, the manufacturer may be able to negotiate a better rate (e.g., for a particular area) with different mobile network operators at any time and simply update the associated VSIM on vehicle 4.

When a consumer purchases vehicle 4 from the automotive dealer and becomes an owner of vehicle 4, he may provision one or more different VSIMs on the OBU of vehicle 4 for his own network access. The owner may authenticate to a desired identity service provider 60 and download a desired one or more VSIMs to be used for connectivity (e.g., 3G or 4G) by the owner. The owner may also download an identity profile to allow personalization of contacts and various preferences provided in the identity profile, as previously described herein (e.g., personalized contacts, vehicle settings, payment methods, device lists, etc.). The owner may also configure authentication requirements to authenticate to vehicle 4 (e.g., set up as desired via key fob, user ID and password, biometrics, etc.).

If another member of the owner's family drives vehicle 4, another VSIM may be provisioned. The family member may authenticate to the same or different identity service provider and download his own one or more VSIMs, which could correspond to the same or different mobile network operators. In addition, a separate identity profile for the family member may also be downloaded to allow for personalization of preferences, subject to policies implemented by the owner or other superagent and subject to priorities related to the role of an agent at a particular time (e.g., driver vs. passenger). The family member may also configure authentication requirements, which could be provided in identity profile, in order to authenticate to vehicle 4 each time the family member is in the vehicle as a driver or a passenger.

Finally, if vehicle 4 is sold, the new owner can download his particular one or more VSIMs and/or identity profile from an appropriate identity service provider, and can create authentication requirements for authenticating to the vehicle. The VSIMs and identity profiles associated with the previous owner, any human agent associated with the previous owner, and any mobile devices may be removed from OBU 30. However, other identity profiles and VSIMs associated with agents such as authorized entities, machine devices, and software agents may remain on OBU 30, if appropriate.

In certain implementations and numerous examples provided herein, vehicle 10 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In certain example implementations, at least some portions of enabling secure transactions and flexible identity management activities outlined herein may be implemented in software. This could be inclusive of software provided in transaction security framework 70 of OBU 30 and in other modules and elements such as secure communication module 77. These elements and/or modules can cooperate with each other in order to perform the enabling secure transactions and flexible identity management activities as discussed herein. In other embodiments, one or more of these features may be implemented in hardware, provided external to these elements, or consolidated in any appropriate manner. For example, some of the processors associated with the various elements may be removed, or otherwise consolidated such that a single processor and a single memory location are responsible for certain activities. In a general sense, the arrangements depicted in FIGS. 1, 3 and 4 may be more logical in their representations, whereas a physical architecture may include various permutations, combinations, and/or hybrids of these elements.

Any of the memory items discussed herein should be construed as being encompassed within the broad term 'memory element.' Similarly, any of the potential processing elements, modules, and machines described in this Specification should be construed as being encompassed within the broad term 'processor.' Furthermore, OBU 30, and each separate component of OBU 30, may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIGS. 1 through 4 may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of FIGS. 1 through 3 and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide mobility data, connectivity parameters, access management, etc. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
    detecting an event for a transaction on an on-board unit (OBU) of a vehicle, the event having a trigger associated with an agent that is authenticated to the OBU, wherein the agent is one of a plurality of authenticated agents provisioned to access the OBU, wherein the agent is associated with a first set of one or more authentication requirements that enable access to the OBU by the agent when the agent is authenticated based on the first set of one or more authentication requirements, and wherein the agent is associated with one or more network credentials provisioned in the OBU to enable a network connection to be established between the OBU and a remote network;
    determining whether at least one of a transaction application or any transaction type that corresponds to the transaction application is mapped to the agent in a mapping database of the OBU, wherein the transaction application corresponds to the transaction associated with the detected event, and wherein the mapping is based on a level of authorization of the agent;
    determining the transaction application is authorized based on a determination that at least one of the transaction application or a transaction type that corresponds to the transaction application is mapped to the agent in the mapping database of the OBU;
    identifying particular network credentials of the one or more network credentials associated with the agent; and
    providing the particular network credentials to the transaction application,
    wherein the network connection is established by the transaction application using the particular network credentials,
    wherein at least one other agent of the plurality of authenticated agents is associated with one or more other network credentials to enable another network connection, initiated by the other agent, to be established between the OBU and the remote network.

2. The method of claim 1, wherein the agent includes the transaction application, the trigger being a request from the transaction application for the particular network credentials, wherein the transaction application establishes the network connection between the OBU and an authorized entity via the remote network.

3. The method of claim 1, wherein the agent is a detector, the trigger being a signal received by the detector from a transaction system external to the vehicle.

4. The method of claim 1, wherein the agent is a human, the trigger being a command from the human through the OBU to initiate the transaction application.

5. The method of claim 1, wherein the agent is a mobile device connected to the OBU through a local network, the trigger being a request from the mobile device for the particular network credentials.

6. The method of claim 1, wherein an identity profile associated with the agent is provisioned in the OBU, the identity profile including information indicating the one or more network credentials.

7. The method of claim 6 further comprising:
    providing application programming interfaces (APIs) to the transaction application to enable the transaction application to access one or more of a plurality of pieces of information of the identity profile.

8. The method of claim 7, further comprising:
    providing payment information to the transaction application, the payment information being one of the plurality of pieces of information included in the identity profile of the agent.

9. The method of claim 1, further comprising:
    detecting a second event for a second transaction on the OBU, the second event having a second trigger associated with the agent;
    identifying second network credentials of the one or more network credentials associated with the agent;
    determining whether the agent needs to be authenticated for the second transaction; and
    determining a second set of one or more authentication requirements associated with the agent if it is determined that the agent needs to be authenticated for the second transaction, wherein the second network credentials are not accessible to a second transaction application that corresponds to the second transaction unless the agent successfully authenticates based on the second set of one or more authentication requirements.

10. The method of claim 9, wherein the second transaction is blocked if the second transaction is not authorized.

11. The method of claim 1, further comprising:
    establishing a second network connection with a second agent via the remote network;
    detecting the second agent in the established second network connection;
    determining a second set of one or more authentication requirements associated with the second agent;
    receiving, from the second agent, updated network credentials associated with the second agent if the second agent successfully authenticates based on the second set of one or more authentication requirements; and
    storing the updated network credentials in a memory element of the OBU.

12. At least one non-transitory machine readable media that includes code for execution and when executed by a processor is operable to perform operations comprising:
    detecting an event for a transaction on an on-board unit (OBU) of a vehicle, the event having a trigger associated with an agent that is authenticated to the OBU, wherein the agent is one of a plurality of authenticated agents provisioned to access the OBU, wherein the agent is associated with a first set of one or more authentication requirements that enable access to the OBU by the agent when the agent is authenticated based on the first set of one or more authentication requirements, and wherein the agent is associated with one or more network credentials provisioned in the OBU to enable a network connection to be established between the OBU and a remote network;

determining whether at least one of a transaction application or any transaction type that corresponds to the transaction application is mapped to the agent in a mapping database of the OBU, wherein the transaction application corresponds to the transaction associated with the detected event, and wherein the mapping is based on a level of authorization of the agent;

determining the transaction application is authorized based on a determination that at least one of the transaction application or a transaction type that corresponds to the transaction application is mapped to the agent in the mapping database of the OBU;

identifying particular network credentials of the one or more network credentials associated with the agent; and providing the particular network credentials to the transaction application, wherein the network connection is established by the transaction application using the particular network credentials, wherein at least one other agent of the plurality of authenticated agents is associated with one or more other network credentials to enable another network connection, initiated by the other agent, to be established between the OBU and the remote network.

13. The at least one non-transitory machine readable medium of claim 12, wherein an identity profile associated with the agent is provisioned in the OBU, the identity profile including information indicating the one or more network credentials.

14. The at least one non-transitory machine readable medium of claim 13, the operations further comprising:
providing application programming interfaces (APIs) to the transaction application to enable the transaction application to access one or more of a plurality of pieces of information of the identity profile.

15. The at least one non-transitory machine readable medium of claim 12, the operations further comprising:
detecting a second event for a second transaction on the OBU, the second event having a second trigger associated with the agent;
identifying second network credentials of the one or more network credentials associated with the agent;
determining whether the agent needs to be authenticated for the second transaction; and
determining a second set of one or more authentication requirements to associated with the agent if it is determined that the agent needs to be authenticated for the second transaction, wherein the second network credentials are not accessible to a second transaction application that corresponds to the second transaction unless the agent successfully authenticates based on the second set of one or more authentication requirements.

16. The at least one non-transitory machine readable medium of claim 12, the operations further comprising:
establishing a second network connection with a second agent on the remote network;
detecting the second agent in the established second network connection;
determining a second set of one or more authentication requirements associated with the second agent;
receiving, from the second agent, updated network credentials associated with the second agent if the second agent successfully authenticates based on the second set of one or more authentication requirements; and
storing the updated network credentials in a memory element of the OBU.

17. The at least one non-transitory machine readable medium of claim 12, wherein the agent includes the transaction application, the trigger being a request from the transaction application for the particular network credentials, wherein the transaction application establishes the network connection between the OBU and an authorized entity via the remote network.

18. The at least one non-transitory machine readable medium of claim 12, wherein the agent is a detector, the trigger being a signal received by the detector from a transaction system external to the vehicle.

19. The at least one non-transitory machine readable medium of claim 12, wherein the agent is a human, the trigger being a command from the human through the OBU to initiate the transaction application.

20. The at least one non-transitory machine readable medium of claim 12, wherein the agent is a mobile device connected to the OBU through a local network, the trigger being a request from the mobile device for the particular network credentials.

21. The at least one non-transitory machine readable medium of claim 14, the operations further comprising:
providing payment information to the transaction application, the payment information being one of the plurality of pieces of information included in the identity profile of the agent.

22. The at least one non-transitory machine readable medium of claim 15, wherein the second transaction is blocked if the second transaction is not authorized.

23. An apparatus, comprising:
a memory element configured to store data and a mapping database;
an authentication and secure transaction module; and
a processor operable to execute instructions associated with the data, wherein the processor, the memory element, and the authentication and secure transaction module cooperate such that the apparatus is configured for:
detecting an event for a transaction on the apparatus, the apparatus configured for operation in a vehicle as an on-board unit (OBU), the event having a trigger associated with an agent that is authenticated to the OBU, wherein the agent is one of a plurality of authenticated agents provisioned to access the OBU, wherein the agent is associated with a first set of one or more authentication requirements that enable access to the OBU by the agent when the agent is authenticated based on the first set of one or more authentication requirements, and wherein the agent is associated with one or more network credentials provisioned in the OBU to enable a network connection to be established between the OBU and a remote network;
determining whether at least one of a transaction application or any transaction type that corresponds to the transaction application is mapped to the agent in a mapping database of the OBU, wherein the transaction application corresponds to the transaction associated with the detected event, and wherein the mapping is based on a level of authorization of the agent;
determining the transaction application is authorized based on a determination that at least one of the transaction application or a transaction type that corresponds to the transaction application is mapped to the agent in the mapping database of the OBU;

identifying particular network credentials of the one or more network credentials associated with the agent; and providing the particular network credentials to the transaction application, wherein the network connection is established by the transaction application using the particular network credentials, wherein at least one other agent of the plurality of authenticated agents is associated with one or more other network credentials to enable another network connection, initiated by the other agent, to be established between the OBU and the remote network.

24. The apparatus of claim 23, wherein the apparatus is further configured for:

providing application programming interfaces (APIs) to the transaction application to enable the transaction application to access one or more of a plurality of pieces of information of an identity profile provisioned in the OBU and associated with the agent.

25. The apparatus of claim 24, wherein the identity profile is downloaded to the OBU from a remote identity service provider and stored in the memory element of the apparatus in an encrypted format.

26. The apparatus of claim 23, wherein the apparatus is further configured for:

establishing a second network connection with a second agent on the remote network;

detecting the second agent in the established second network connection;

determining a second set of one or more authentication requirements associated with the second agent;

receiving, from the second agent, updated network credentials associated with the second agent if the second agent successfully authenticates based on the second set of one or more authentication requirements; and storing the updated network credentials in the memory element of the OBU.

27. The apparatus of claim 23, wherein the agent includes the transaction application, the trigger being a request from the transaction application for the particular network credentials, wherein the transaction application establishes the network connection between the OBU and an authorized entity via the remote network.

28. The apparatus of claim 23, wherein the agent is a detector, the trigger being a signal received by the detector from a transaction system external to the vehicle.

29. The apparatus of claim 23, wherein the agent is a human, the trigger being a command from the human through the OBU to initiate the transaction application.

30. The apparatus of claim 23, wherein the agent is a mobile device connected to the OBU through a local network, the trigger being a request from the mobile device for the particular network credentials.

31. The apparatus of claim 24, wherein the apparatus is further configured for:

providing payment information to the transaction application, the payment information being one of the plurality of pieces of information included in the identity profile of the agent.

32. The apparatus of claim 23, wherein the apparatus is further configured for:

detecting a second event for a second transaction on the OBU, the second event having a second trigger associated with the agent;

identifying second network credentials of the one or more network credentials associated with the agent;

determining whether the agent needs to be authenticated for the second transaction; and determining a second set of one or more authentication requirements to associated with the agent if it is determined that the agent needs to be authenticated for the second transaction, wherein the second network credentials are not accessible to a second transaction application that corresponds to the second transaction unless the agent successfully authenticates based on the second set of one or more authentication requirements.

33. The apparatus of claim 32, wherein the second transaction is blocked if the second transaction is not authorized.

34. The apparatus of claim 23, wherein an identity profile associated with the agent is provisioned in the OBU, the identity profile including information indicating the one or more network credentials.

* * * * *